(12) United States Patent
Tsuda

(10) Patent No.: US 9,785,635 B2
(45) Date of Patent: *Oct. 10, 2017

(54) DOCUMENT CHECKING APPARATUS, COMPUTER-READABLE RECORDING MEDIUM, AND DOCUMENT CHECKING METHOD

(71) Applicant: FUJITSU LIMITED, Kawasaki-shi, Kanagawa (JP)

(72) Inventor: Hiroshi Tsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 318 days.

This patent is subject to a terminal disclaimer.

(21) Appl. No.: 13/873,635

(22) Filed: Apr. 30, 2013

(65) Prior Publication Data

US 2013/0232162 A1    Sep. 5, 2013

Related U.S. Application Data

(63) Continuation of application No. 12/659,219, filed on Mar. 1, 2010, now Pat. No. 8,453,249.

(30) Foreign Application Priority Data

Mar. 2, 2009 (JP) .................. 2009-048530
Dec. 28, 2009 (JP) .................. 2009-298880

(51) Int. Cl.
*G06F 7/04* (2006.01)
*G06F 17/30* (2006.01)
(Continued)

(52) U.S. Cl.
CPC ...... *G06F 17/30011* (2013.01); *G06F 21/554* (2013.01); *H04L 51/12* (2013.01)

(58) Field of Classification Search
CPC .. G06F 21/10; G06F 21/554; G06F 17/30011; H04L 51/12
(Continued)

(56) References Cited

U.S. PATENT DOCUMENTS

| 5,907,821 A | 5/1999 | Kaji et al. |
| 7,392,175 B2 | 6/2008 | Kawatani |
| 7,594,277 B2 | 9/2009 | Zhang et al. |
| 2006/0005247 A1* | 1/2006 | Zhang et al. .................... 726/26 |

(Continued)

FOREIGN PATENT DOCUMENTS

| EP | 1 613 020 A2 | 8/1994 |
| EP | 0 687 987 A1 | 12/1995 |

(Continued)

OTHER PUBLICATIONS

Japanese Office Action issued Jul. 30, 2013 for corresponding Japanese Application No. 2009-298880.

*Primary Examiner* — Farid Homayounmehr
*Assistant Examiner* — Suman Debnath
(74) *Attorney, Agent, or Firm* — Staas & Halsey LLP

(57) ABSTRACT

A document checking apparatus includes a keyword appearance position extracting unit that extracts keywords and the appearance positions of the keywords from a target document including a confidential document; a keyword pair extracting unit that treats each keyword of the appearance positions of the extracted keywords as a target and determines whether there is another extracted keyword within a predetermined range before and after the target keyword; a feature element matrix creating unit that generates, when it is determined that there is the another keyword, combination information obtained by combining the determination target keyword and the another keyword in association with anteroposterior information of the appearance positions of the keywords; and a computing unit that determines whether the number of combination information, among the plurality (Continued)

of combination information of the generated target document, identical to the combination information of the confidential document is not less than a predetermined value.

14 Claims, 29 Drawing Sheets

(51) Int. Cl.
*G06F 21/55* (2013.01)
*H04L 12/58* (2006.01)

(58) Field of Classification Search
USPC ........ 726/22–26, 32; 707/747, 780; 709/206
See application file for complete search history.

(56) References Cited

U.S. PATENT DOCUMENTS

| | | | |
|---|---|---|---|
| 2006/0253438 A1 | 11/2006 | Ren et al. | |
| 2008/0222128 A1* | 9/2008 | Yoshida et al. | 707/5 |
| 2009/0077073 A1* | 3/2009 | Masuyama et al. | 707/6 |
| 2009/0157656 A1 | 6/2009 | Chen et al. | |
| 2009/0238474 A1* | 9/2009 | Sandberg | G06K 9/723 |
| | | | 382/229 |

FOREIGN PATENT DOCUMENTS

| | | |
|---|---|---|
| EP | 1 939 767 A1 | 7/2008 |
| JP | 2004-164036 | 6/2004 |
| JP | 2005-234930 | 9/2005 |
| JP | 2006-065837 | 3/2006 |
| JP | 2008-123111 | 5/2008 |
| JP | 2009-514076 | 4/2009 |

* cited by examiner

FIG.3

| KEYWORD | APPEARANCE POSITION | HASH VALUE |
|---|---|---|
| SEMI-CONDUCTOR | 10 | 3 |
| MIE | 28 | 1 |
| ADVANCED | 33 | 2 |

FIG.4

COLUMN

```
        1  2  3  4  5  6  7  .....  MaxS        (3, 5) ELEMENT
     1  0  0  0  0  0  0  0  .........
     2  0  0  0  0  0  0  0
     3  0  0  0  1 (1) 0  1
ROW  4  0  0  0  0  1  0  0
     5  0  0  0  0  0  0  0
     6  0  0  0  0  0  0  0
     7  0  0  0  0  0  0  0
     .     .........
     .
   MaxS
```

FIG.6

| TIME AND DATE | TRANSMITTER | RECEIVER | FEATURE ELEMENT MATRIX (SERIALIZATION) |
|---|---|---|---|
| 2008-12-10 13:10:25 | hh@xxx.com | gg@xxx.com, kk@xxx.com | 39/3AF0 |
| 2008-12-11 12:02:18 | gg@xxx.com | hh@xxx.com, uu@xxx.com | 47/6B10 |
| 2008-12-13 18:30:08 | hh@xxx.com | uu@yyy.com | 22/54E0 |

FIG.7

COLUMN

FEATURE ELEMENT MATRIX 300

|   | 1 | 2 | 3 | 4 | 5 | 6 | 7 | 8 |
|---|---|---|---|---|---|---|---|---|
| 1 | 0 | 0 | 1 | 1 | 0 | 0 | 0 | 0 |
| 2 | 0 | 0 | 0 | 0 | 0 | 0 | 0 | 0 |
| 3 | 1 | 0 | 1 | 1 | 1 | 0 | 0 | 0 |
| 4 | 0 | 0 | 0 | 0 | 1 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

ROW

DEGENERATE VECTOR 310

1 2 3 4 5 6 7 8
1 0 1 1 1 0 0 0
(BYTE FORMAT : B8)

DEGENERATE MATRIX 320

0 1 1 0
1 0 1 1
0 0 0 1
0 0 0 0

(BYTE FORMAT : 6B10)

SERIALIZATION RESULT : B8/6B10

M3=AND (M1, M2)

COMMON MATRIX (M3)
400c

|   | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 1 | 1 | 0 | 0 | 0 |
| 4 | 0 | 0 | 0 | 0 | 1 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

B1

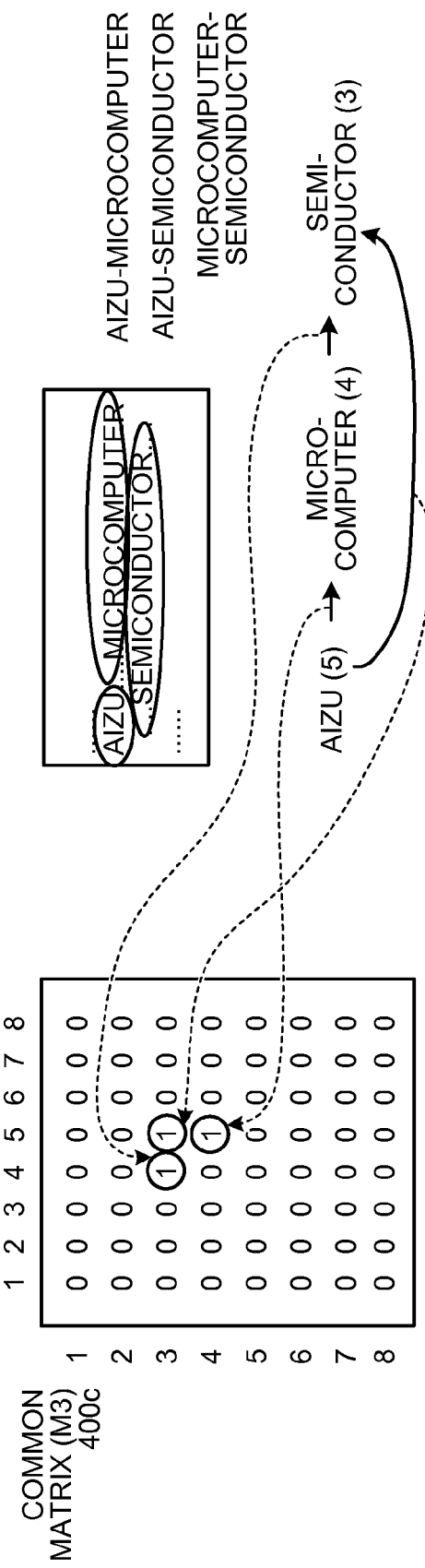

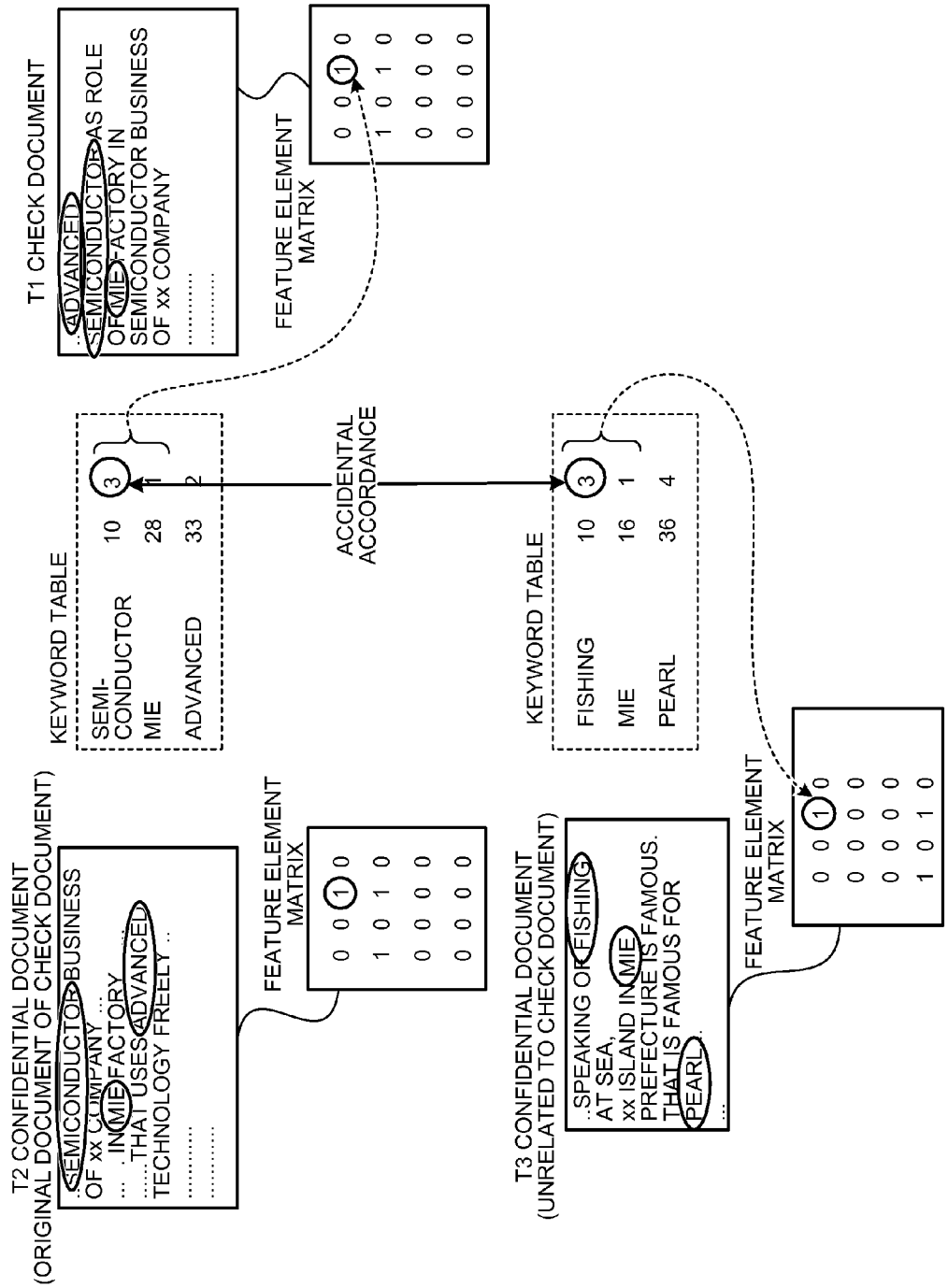

FIG.18

KEYWORD TABLE
410

| WORD POSITION (410a) | KEYWORD (410b) | APPEARANCE POSITION (410c) | HASH VALUE (410d) | SIMILARITY DEGREE (410e) |
|---|---|---|---|---|
| 1 | A | 10 | 28 | 0 |
| 2 | B | 28 | 32 | 0 |
| ⋮ | ⋮ | ⋮ | ⋮ | ⋮ |
| 22 | C | 135 | 5 | 1 |
| 23 | D | 149 | 30 | 1 |
| 24 | E | 163 | 14 | 1 |
| 25 | F | 180 | 7 | 1 |
| 26 | G | 198 | 16 | 1 |
| 27 | H | 210 | 22 | 1 |
| 28 | I | 230 | 8 | 1 |
| 29 | J | 242 | 2 | 0 |
| 30 | K | 260 | 12 | 0 |
| ⋮ | ⋮ | ⋮ | ⋮ | ⋮ |

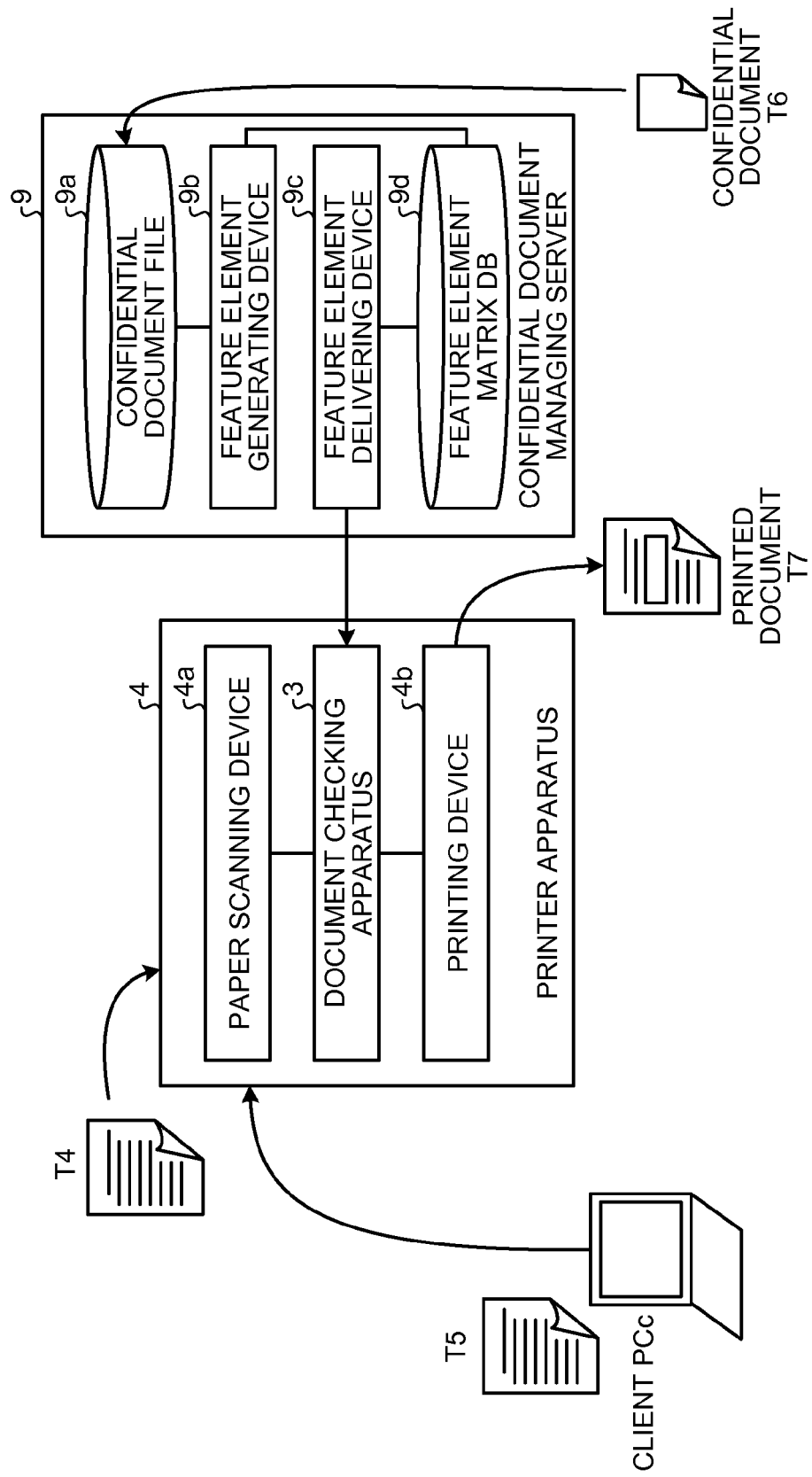

FIG.27

DOCUMENT IMAGE (PAPER) S1

PROJECT NAME: ZZZ PROJECT
REPORT DATE: FEBRUARY, 2009

1. DEVELOPMENTAL STATUS OF AAA SYSTEM
PROGRESS ACCORDING TO SCHEDULE. TEST
PROCESS WILL START ON MARCH 8.
2. DEVELOPMENTAL STATUS OF BBB SYSTEM
PROGRESS ACCORDING TO SCHEDULE. THREE
STAFFS ARE INCREASED SINCE MARCH 1,
DEVELOPMENT OF PHASE 2 WILL START.
3. BRIEF OF RELATED BUSINESS:
OUR COMPANY AGAINST CURRENT ECONOMIC
SITUATION SEEMS TO ACCOUNT FOR SPECIAL
LOSS OF DEGRADATION 7,400,000,000 YEN OF
CLOSED MANUFACTURING LINE OF HEAD FOR HDD
AND APPRAISED LOSS 6,400,000,000 YEN OF LISTED
STOCK CAUSED BY DECLINE OF MARKET PRICE.

↑ OCR

CHECK TARGET TEXT S2
(●: RECOGNITION ERROR)

PROJECT NAME: ZZ● PROJECT
REPORT DATE: FEBRUARY, 2009

▲● DEVELOP●●●● STATUS OF AXY SYSTEM
▲PROGRESS ACCORDING TO SCHEDULE. TEST
PROCESS WILL ▲START ON MARCH 8.
▲2. ●●LOPMENTAL STATUS OF BCZ ●YSTEM
▲PROGRESS ACCORDING TO SCHEDULE. THREE
STAFFS ARE ▲INCREASED SINCE MARCH 1,
▲DEVELOPMENT OF PHASE 2 WILL START.
▲3. BRI●● OF RELAT●● BUSINESS:
●●● COMPANY AGAINST ▲CURRENT ECONOMIC
SITUA●● SEEMS TO ▲ACCOUNTS FOR SPECIAL
LOSS ●● OF DEGRADATION 7,400,000,000 YEN ▲OF
CLOSED MANUFACTURING LI●● OF HEAD ●● HDD
AND ▲APPRAI●●● LOSS 6,400,000,000 YEN OF LISTED
●●OCK CAUSED BY ▲DECLINE OF MARKET PRICE.

S2a

⇕ SIMILARITY DEGREE COMPUTATION

CONFIDENTIAL DOCUMENT S3

ON THE OTHER HAND, OUR COMPANY
ACCOUNTED FOR SPECIAL LOSS OF
DEGRADATION LOSS 7,400,000,000
YEN ACCORDING TO CLOSED
MANUFACTURING LINE OF HEAD FOR
HDD AND ELECTRONIC COMPONENT
BUSINESS AND APPRAISED LOSS
6,400,000,000 YEN ACCORDING TO
LISTED STOCK OF AMERICAN S
COMPANY OR THE LIKE OF WHICH
MARKET PRICE DECLINES
REMARKABLY.

SIMILAR PART S2a

●●● COMPANY AGAINST CURRENT ECONOMIC
SITUA●● SEEMS TO ▲ACCOUNTS FOR SPECIAL
LOSS ●● OF DEGRADATION 7,400,000,000 YEN ▲OF
CLOSED MANUFACTURING LI●● OF HEAD ●● HDD
AND ▲APPRAI●●● LOSS 6,400,000,000 YEN OF LISTED
●●OCK CAUSED BY ▲DECLINE OF MARKET PRICE.

⇓ WHITE PAINTING

PRINTED DOCUMENT S4

PROJECT NAME: ZZZ PROJECT
REPORT DATE: FEBRUARY, 2009

1. DEVELOPMENTAL STATUS OF AAA SYSTEM
PROGRESS ACCORDING TO SCHEDULE. TEST
PROCESS WILL START ON MARCH 8.
2. DEVELOPMENTAL STATUS OF BBB SYSTEM
PROGRESS ACCORDING TO SCHEDULE. THREE
STAFFS ARE INCREASED SINCE MARCH
1. DEVELOPMENT OF PHASE 2 WILL START.
3. BRIEF OF RELATED BUSINESS:

MARKET PRICE.

DOCUMENT CHECKING APPARATUS, COMPUTER-READABLE RECORDING MEDIUM, AND DOCUMENT CHECKING METHOD

CROSS-REFERENCE TO RELATED APPLICATION(S)

This application is a Continuation of U.S. application Ser. No. 12/659,219, filed Mar. 1, 2010, pending, which is based upon and claims the benefit of priority of the prior Japanese Patent Application No. 2009-048530, filed on Mar. 2, 2009 and Japanese Patent Application No. 2009-298880, filed on Dec. 28, 2009, the entire contents of which are incorporated herein by reference.

FIELD

The embodiments discussed herein are directed to a document checking apparatus, a computer-readable recording medium, and a document checking method.

BACKGROUND

Conventionally, to prevent leakage of confidential information or private information caused by the transmission of an electronic mail or the like, it has become important that a mail server in a company, for example, determines a similarity between a transmission document and an archived confidential document before transmitting the transmission document outside the company and does not transmit the transmission document outside the company if a similarity is between the documents.

As a similarity determination method between documents, there is disclosed a technology for computing hash values for sentences that constitute each document of a transmission document and a confidential document and determining whether a sentence having a hash value identical to the hash value of a sentence constituting the confidential document is or not in the transmission document to determine similarity.

Moreover, as a similarity determination method between documents, there is disclosed a technology for determining whether a keyword included in a transmission document is included in a confidential document to determine similarity. For example, when concatenated keywords such as "alkaline battery", "potassium battery", or "fuel battery" are retrieved for a keyword "battery", whether a concatenated keyword included in a transmission document is in a confidential document can be determined at high speed by using the hash value of the keyword "battery" and the character ("e", "m", or "l") before or behind the keyword as an index.

Furthermore, there is a signature that indicates the feature element of a document as an item by which whether or not a keyword is in the document can be determined. A signature is, for example, data that is obtained by performing a logical sum on bit streams obtained from a plurality of keywords in a confidential document. When a result obtained by performing a logical product on the signature and the bit stream of a keyword included in the transmission document is not a zero vector, it is determined that the keyword can be included in the confidential document. In addition, the signature can be computed from a character string that is obtained by adding a peripheral character string of a keyword to the keyword.

Such conventional similarity determination methods have been known as disclosed in, for example, Japanese Laid-open Patent Publication No. 2006-065837, Japanese Laid-open Patent Publication No. 2005-234930, and U.S. Patent Application Publication 2006/0253438.

When a transmission document is a document that is obtained by revising the structure of sentences inside a confidential document or by modifying particles inside the confidential document, there is a problem in that a similarity between the transmission document and the confidential document cannot be determined with high accuracy.

For example, when a similarity between a transmission document and a confidential document is determined for each sentence, a similarity between the transmission document and the confidential document cannot be determined because the hash values of sentences are changed when the transmission document is a document obtained by dividing the sentences of the confidential document, a document obtained by merging the plurality of sentences of the confidential document, or a document obtained by modifying the particles inside the confidential document.

Moreover, when a similarity between a transmission document and a confidential document is determined by retrieving a keyword, whether a keyword included in the transmission document is perfectly identical to a keyword inside the confidential document can be determined. However, a similarity between documents cannot be determined with high accuracy.

Furthermore, when a similarity between a transmission document and a confidential document is determined by using a signature, whether keywords inside the transmission document can be in the confidential document can be determined. However, because the determination is performed by the presence or absence of any bit constituting the keywords, it can be determined by mistake that two documents have similarity even if the keywords included in the transmission document are discretely included in the confidential document in a completely different context.

SUMMARY

According to an aspect of an embodiment of the invention, a document checking apparatus includes an extracting unit that extracts keywords and appearance positions of the keywords from a determination target document including a specific document that becomes a comparison target when determining similarity between documents; a keyword pair extracting unit that determines, by using the each keyword of the appearance positions extracted by the extracting unit as a target, whether another keyword extracted by the extracting unit is within a predetermined range before and after the target keyword; a generating unit that generates, when it is determined by the keyword pair extracting unit that there is the another keyword, combination information that is obtained combining the determination target keyword and the another keyword in association with anteroposterior information of the appearance positions of the keywords; and a similarity computing unit that compares a plurality of combination information of the determination target document generated by the generating unit and a plurality of combination information of the specific document, determines whether a number of combination information, among the plurality of combination information of the determination target document, identical to the combination information of the specific document is not less than a first similarity determination number, and determines similarity between the determination target document and the specific document on the basis of the determination result.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of the data structure of a keyword table;

FIG. 4 is a diagram illustrating an example of a feature element matrix;

FIG. 6 is a diagram illustrating an example of the data structure of a feature element matrix DB;

FIG. 7 is a diagram illustrating an example of the serializing method of the feature element matrix;

FIG. 8A is a diagram illustrating an example of the similarity check of a similarity check 1;

FIG. 8B is a diagram illustrating an example of the similarity check of the similarity check 1;

FIG. 9A is a diagram illustrating an example of three continuous hash values;

FIG. 9C is a diagram illustrating the necessity of the similarity check 2;

FIG. 18 is a diagram illustrating an example of the data structure of a keyword table according to the second embodiment;

FIG. 26 is a diagram explaining an example of an application of the document checking apparatus according to the third embodiment; and FIG. 27 is a diagram explaining an example of a print result obtained by using a printer apparatus according to the third embodiment.

DESCRIPTION OF EMBODIMENTS

Preferred embodiments of the present invention will be explained with reference to accompanying drawings.

The present invention is not limited to the embodiments explained below.

[a] First Embodiment

Concept of Document Checking Apparatus According to First Embodiment

Figure 1:
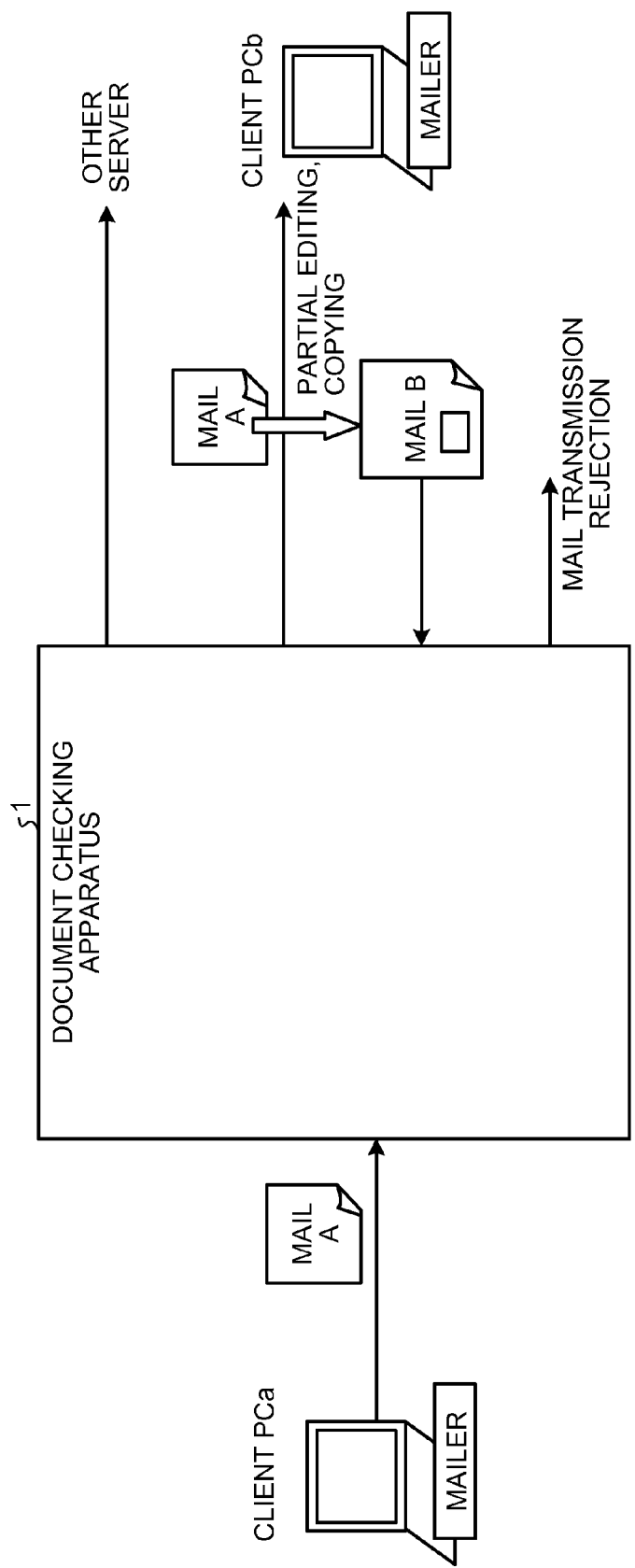
FIG. 1 is a diagram illustrating the concept of a document checking apparatus according to a first embodiment.

FIG. 1 is a diagram explaining the concept of a document checking apparatus 1 according to the first embodiment of the present invention. As illustrated in FIG. 1, when the destination of a mail "A" (confidential document) received from a client "PCa" is an in-company address, for example, a client "PCb", the document checking apparatus 1 transmits the received mail "A" to the client "PCb" and stores the special feature of the mail "A".

On the other hand, when the destination of a mail "B" received from the client "PCb" is an out-company address, for example, another server, the document checking apparatus 1 compares the received mail "B" and a plurality of confidential documents that is previously stored. Then, the document checking apparatus 1 determines whether the received mail "B" is similar to the confidential documents on the basis of the comparison result and rejects to transmit the mail "B" outside the company when they are similar to each other.

In other words, the document checking apparatus 1 does not transmit outside the company the mail "B" that is created by the client "PCb" by partially copying or editing the contents of the internal-consumption mail "A" that is the confidential document.

Specifically, the document checking apparatus 1 compares a document feature element (signature) indicative of the special feature of the document of the mail "B" that is a determination target document with a document feature element of the mail "A" that is a confidential document. The document checking apparatus 1 compares a document feature element that includes a plurality of combination information obtained by combining as a pair two keywords within the range of a predetermined number of characters included in the mail "B", which is a determination target document and in which similarity is determined between the mail "B" and the confidential document, with the document feature element of the mail "A" that is the confidential document. The combination information is obtained by combining paired two keywords in association with anteroposterior information of each appearance position. In addition, a keyword means a word or a phrase that becomes a key in a document.

Then, the document checking apparatus 1 determines whether the number of combination information, among the plurality of combination information of the mail "B" that is the determination target document, identical to the combination information of the mail "A" is not less than a predetermined value on the basis of the comparison result (similarity check 1).

Then, when it is determined that the number of identical combinations is not less the predetermined value, the document checking apparatus 1 further determines whether a group of combination information combined from at least three or more keywords appears within the same range of the predetermined number of characters and determines whether the group is not less the predetermined value (similarity check 2).

As a result, when it is determined that the group of combination information is not less than the predetermined value, the document checking apparatus 1 determines that the documents are similar to each other and rejects to transmit the mail "B" to another server.

As above, a confidential document that is treated by the document checking apparatus 1 according to the present embodiment has been explained as a mail. However, the confidential document may be the main body of a mail or a document attached to a mail, or may be a document created from a work other than a mail. Moreover, a confidential document that is the similarity checking target of the mail "B" may be limited to mails that are transmitted or received by the client "PCb" in past times to improve the efficiency of a process. In the present embodiment, it is assumed that "similarity check 1" and "similarity check 2" correspond to a document checking process.

Configuration of Document Checking Apparatus According to First Embodiment

Figure 2:
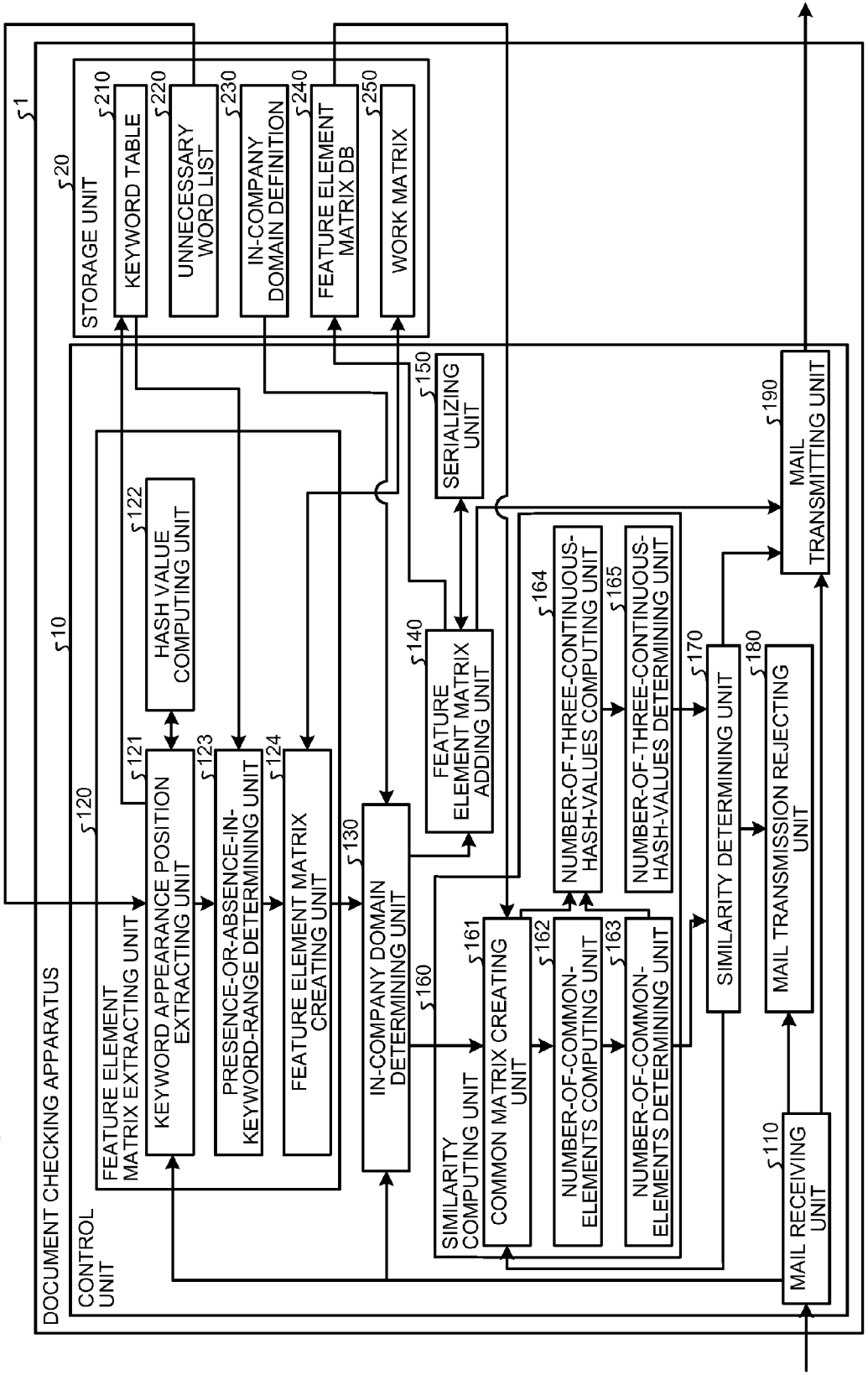
FIG. 2 is a functional block diagram illustrating the configuration of the document checking apparatus according to the first embodiment.

FIG. 2 is a functional block diagram illustrating the configuration of the document checking apparatus 1 according to the first embodiment. As illustrated in FIG. 2, the document checking apparatus 1 includes a control unit 10 and a storage unit 20.

The control unit 10 is a processing unit that executes a process based on a program that defines a document checking process and the like. The control unit 10 includes a mail receiving unit 110, a feature element matrix extracting unit 120, an in-company domain determining unit 130, a feature element matrix adding unit 140, a serializing unit 150, a similarity computing unit 160, a similarity determining unit 170, a mail transmission rejecting unit 180, and a mail transmitting unit 190.

The storage unit 20 stores therein data required for the document checking process performed by the control unit 10. The storage unit 20 includes an unnecessary word list 220, an in-company domain definition 230, and a feature element matrix DB 240. The storage unit 20 further includes a keyword table 210 and a work matrix 250 as a temporary data area for each document.

The mail receiving unit 110 receives a mail transmitted from a client PC in a company and extracts a character string of the main body of the mail and a character string included in an attached file attached to the mail from the received mail. Hereinafter, it is assumed that the character string of the main body of the mail and the character string included in the attached file extracted from the mail receiving unit 110 are referred to as "check target text".

Moreover, the mail receiving unit 110 outputs the extracted check target text to the feature element matrix extracting unit 120 and outputs the extracted main body of the mail to the in-company domain determining unit 130. Furthermore, the mail receiving unit 110 outputs the received mail to the mail transmission rejecting unit 180 and the mail transmitting unit 190.

When acquiring the check target text from the mail receiving unit 110, the feature element matrix extracting unit 120 extracts a feature element matrix, which is obtained by arranging the feature elements of the text as a matrix, from the check target text. It will be below explained about the detailed information of the feature element matrix. Furthermore, the feature element matrix extracting unit 120 includes a keyword appearance position extracting unit 121, a hash value computing unit 122, a presence-or-absence-in-keyword-range determining unit 123, and a feature element matrix creating unit 124.

When acquiring the check target text from the mail receiving unit 110, the keyword appearance position extracting unit 121 stores, for the plurality of keywords extracted from the check target text, the appearance position and hash value of each keyword as one record in the keyword table 210.

For example, the keyword appearance position extracting unit 121 extracts a word that is not included in the unnecessary word list 220 as a keyword from the check target text and counts the appearance positions of the extracted keyword from the lead position of the check target text.

In this case, the unnecessary word list 220 is a list that stores words (unnecessary word) excluded from the keyword. The unnecessary words includes, for example, frequent words in a general document that are Japanese particles such as "GA" or "WO", demonstratives such as "this" or "that", "computer", and the like.

Moreover, the keyword appearance position extracting unit 121 makes the hash value computing unit 122 compute the hash value of the extracted keyword and stores the extracted keyword, the appearance position, and the hash value as one record in the keyword table 210.

Furthermore, when information related to all keywords in the check target text is stored in the keyword table 210, the keyword appearance position extracting unit 121 outputs the notification of the effect that the keyword table 210 has been created to the presence-or-absence-in-keyword-range determining unit 123.

Now, it will be explained about an example of the data structure of the keyword table 210 with reference to FIG. 3. As illustrated in FIG. 3, the keyword table 210 includes a keyword, an appearance position, and a hash value and is temporarily stored in the storage unit 20.

When acquiring the keyword from the keyword appearance position extracting unit 121, the hash value computing unit 122 computes a hash value from the acquired keyword and outputs the computed hash value to the keyword appearance position extracting unit 121.

A hash value computing method includes a method for adding one to a remainder that is obtained by dividing a value obtained by adding all character codes of characters constituting the keyword by the maximum hash value. The hash value computing method further includes a method for adding one to a remainder that is obtained by dividing a value obtained by performing exclusive OR on the character codes of characters constituting the keyword by the maximum hash value or a method for adding one to a remainder that is obtained by dividing a value obtained by coupling the character codes of characters constituting the keyword by the maximum hash value. Furthermore, the hash value computing method includes a method for selecting a numeric value corresponding to a keyword as a hash value in accordance with a correspondence table in which keywords and specific numeric values are previously defined in a one-to-one manner. However, the present invention is not limited to these methods.

When acquiring the notification of the effect that the keyword table 210 has been created from the keyword appearance position extracting unit 121, the presence-or-absence-in-keyword-range determining unit 123 determines, by using each keyword stored in the keyword table 210 as a determination target, whether another keyword is or not within the range of the predetermined number of characters from the appearance position of the determination target keyword toward the rear of the sentence.

When it is determined that another keyword is within the range of the predetermined number of characters from the appearance position of the determination target keyword toward the rear of the sentence, the presence-or-absence-in-keyword-range determining unit 123 generates a matrix element that is obtained by associating the hash value of the determination target keyword with the hash value of the other keyword. The matrix element is obtained by associating the front and back of the appearance position of each keyword with, for example, a column and a row and corresponds to combination information.

For example, when the hash value of the determination target keyword is "5" and the hash value of the other keyword located at the rear of the appearance position of the determination target keyword is "3", a matrix element becomes the third row and fifth column, that is, (3, 5).

Moreover, the presence-or-absence-in-keyword-range determining unit 123 outputs a matrix element, which is obtained by associating the hash value of the determination target keyword and the hash value of the other keyword, to the feature element matrix creating unit 124 for each determination target.

It has been explained about the case where the presence-or-absence-in-keyword-range determining unit 123 determines whether another keyword is or not from the appearance position of the determination target keyword toward the rear of the sentence. However, the present invention is not limited to this. It may be determined whether another keyword is or not from the appearance position of the determination target keyword toward the front of the sentence.

Moreover, it has been explained about the case where a matrix element is obtained by associating the hash value of the determination target keyword and the hash value of the other keyword with the front and back of the appearance position of each keyword, for example, a column and a row. However, the present invention is not limited to this. The front and back of the appearance position of each keyword may be associated a row and a column.

Furthermore, the predetermined number of characters is, for example, 100 characters. It is preferable that the number can fall within a range in which a plurality of keywords can appear. The number is previously checked by an experiment and is stored in the storage unit 20.

When acquiring the matrix element generated from the presence-or-absence-in-keyword-range determining unit 123 for each determination target, the feature element matrix creating unit 124 creates a feature element matrix corresponding to the check target text by using the acquired matrix elements.

Specifically, the feature element matrix creating unit 124 assigns a memory area (the work matrix 250) having the size required to create the feature element matrix of the check target text to the storage unit 20. Then, the feature element matrix creating unit 124 sets the matrix element generated for each determination target to a specific value (for example, "1") to create the feature element matrix for the work matrix 250.

The work matrix 250 is the sequence of numbers that is obtained by linking the values ("0" or "1") of the rows of the feature element matrix in order and is stored as a memory area having the size of row number×column number bits.

Figure 5:
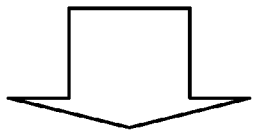
FIG. 5 is a diagram illustrating the creation example of the feature element matrix.

Now, it will be explained about the creation of the feature element matrix with reference to FIGS. 4 and 5. FIG. 4 is a diagram illustrating an example of the feature element matrix. FIG. 5 is a diagram illustrating the creation example of the feature element matrix.

First, it will be explained about an example of the feature element matrix with reference to FIG. 4. As illustrated in FIG. 4, the feature element matrix is a two-dimensional fixed-length square matrix of which the number of rows is MaxS and the number of columns is MaxS.

For example, when a matrix element (3, 5) is specific value "1", this means that the keyword of a hash value "3" is within the range of the predetermined number of characters toward the rear of the keyword of a hash value "5".

In this case, the MaxS value is the maximum hash value, for example, several ten-thousand. However, the present invention is not limited to this.

Next, it will be explained about the creation example of the feature element matrix with reference to FIG. 5. As illustrated in FIG. 5, a feature element matrix 300 is created from the keyword table 210 created from the confidential document.

Specifically, when a keyword "semiconductor" (appearance position 10 and hash value 3) included in the keyword table 210 is a determination target, other keywords are present within the range of the predetermined number of characters (for example, 100 characters) from the appearance position "10" of "semiconductor". The other keywords are "Mie" (appearance position 28 and hash value 1) and "advanced" (appearance position 33 and hash value 2).

At this time, the feature element matrix creating unit 124 sets, to a specific value "1", a matrix element (1, 3) that is obtained by assigning the hash value "3" of the keyword "semiconductor" located at the front of the keyword "Mie" to a column and assigning the hash value "1" of the keyword "Mie" located at the back of the keyword "semiconductor" to a row.

Similarly, the feature element matrix creating unit 124 sets a matrix element (2, 3) to a specific value "1" even in the case of a relationship between the keywords "semiconductor" and "advanced".

After that, the feature element matrix creating unit 124 performs the above operations while sequentially changing the determination targets and creates the feature element matrix 300.

Returning to FIG. 2, the in-company domain determining unit 130 determines whether the transmission destination of mail is an in-company address.

Specifically, when acquiring the main body of the mail of the check target text from the mail receiving unit 110 and acquiring the feature element matrix from the feature element matrix creating unit 124, the in-company domain determining unit 130 checks the transmission destination included in the main body of the mail with an in-company domain stored in the in-company domain definition 230 and determines whether the transmission destination is or not the in-company domain on the basis of the check result.

In this case, the in-company domain definition 230 is configured from a character string that is obtained by expressing the in-company domain with a pattern sequence and includes, for example, "*.xxx.com" or "*.xxx.co.jp" (for example, xxx is the alphabetic characters of a company name).

When it is determined that the transmission destination of the mail is the in-company domain, the in-company domain determining unit 130 outputs the feature element matrix of the check target text and the main body of the mail of the check target text to the feature element matrix adding unit 140 in order to keep the mail as a confidential document. On the other hand, when it is determined that the transmission destination of the mail is not an in-company domain, the in-company domain determining unit 130 outputs the feature element matrix of the check target text to a common matrix creating unit 161 in order to compute a similarity between the check target text and a confidential document.

When acquiring the feature element matrix of the check target text from the in-company domain determining unit 130, the feature element matrix adding unit 140 adds the acquired feature element matrix to the feature element matrix DB (Database) 240. In other words, because the mail is a mail having an in-company address when the transmission destination of the mail is an in-company domain, the feature element matrix adding unit 140 previously stores the check target text of the mail in the feature element matrix DB 240 as a confidential document.

Specifically, when acquiring the feature element matrix of the check target text from the in-company domain determining unit 130, the feature element matrix adding unit 140 outputs the acquired feature element matrix to the serializing unit 150 and acquires the serialization result of the output feature element matrix to the serializing unit 150.

Moreover, the feature element matrix adding unit 140 extracts a mail reception date, a transmission source, and a transmission destination from the main body of the mail acquired from the in-company domain determining unit 130 stores the extracted information and the serialization result in the feature element matrix DB 240 as one record.

Furthermore, the feature element matrix adding unit 140 informs the mail transmitting unit 190 of the transmission request for the mail.

Now, it will be explained about an example of the data structure of the feature element matrix DB 240 with reference to FIG. 6. FIG. 6 is a diagram illustrating an example of the data structure of the feature element matrix DB 240. As illustrated in FIG. 6, the feature element matrix DB 240 is configured from mail reception date and time, a transmitter represented by the mail address, a receiver represented by the mail address, and serialized feature element matrix. The feature element matrix DB 240 stores a record consisting of these elements for each confidential document.

When acquiring the feature element matrix of the check target text from the feature element matrix adding unit 140, the serializing unit 150 serializes the acquired feature element matrix and outputs the serialization result to the feature element matrix adding unit 140. The serialization means that the feature element matrix is converted into one-dimensional data such as a character string without changing an amount of information of the feature element matrix.

Now, it will be explained about an example of the serializing method of the feature element matrix with reference to FIG. 7. FIG. 7 is a diagram illustrating an example of the serializing method of the feature element matrix. In FIG. 7, for convenience of explanation, it is assumed that the feature element matrix is eight rows and eight columns.

First, when the i-th row (i is 1 to 8) or the i-th column of the feature element matrix 300 includes a specific value "1", the serializing unit 150 sets the i-th value of a degenerate vector 310 to the specific value "1". In the example of the feature element matrix 300 illustrated in FIG. 7, because the specific value "1" is set to the i-th row or the i-th column when "i" is 1, 3, 4, and 5, the degenerate vector 310 becomes "10111000".

Next, the serializing unit 150 takes out only the rows and columns from the feature element matrix 300, which respectively correspond to the orders of the bits of the degenerate vector 310 that have the specific value "1" in the degenerate vector 310, and creates a degenerate matrix 320. In the example of the feature element matrix 300 illustrated in FIG. 7, because the degenerate vector 310 is "10111000", in order words, the first, third, fourth, and fifth bits have the specific value "1", the values of only the first, third, fourth, and fifth rows and columns are taken out from the feature element matrix 300 and the degenerate matrix 320 is created.

Furthermore, the serializing unit 150 converts (byte format) the information of the degenerate vector 310 and the degenerate matrix 320 into hexadecimal values by eight bits and acquires the serialization result "B8/6B10".

The serializing method further includes a method for using data obtained by simply converting binary digit data of zero and one of the feature element matrix into hexadecimal values by eight bits as a serialization result in addition to the method described above. Moreover, the serializing method further includes a method (compression method using "run length") for using data obtained by counting the number of continuous zeros and the number of continuous ones in the order of zero and one listed in the feature element matrix as a serialization result. However, the present invention is not limited to these.

Returning to FIG. 2, when the in-company domain determining unit 130 determines that the transmission destination of the mail is not an in-company domain, the similarity computing unit 160 computes a similarity between the check target text and the confidential document. Furthermore, the similarity computing unit 160 includes the common matrix creating unit 161, a number-of-common-elements computing unit 162, a number-of-common-elements determining unit 163, a number-of-three-continuous-hash-values computing unit 164, and a number-of-three-continuous-hash-values determining unit 165.

When acquiring the feature element matrix of the check target text from the in-company domain determining unit 130, the common matrix creating unit 161 computes the logical product of the feature element matrix of the check target text and the feature element matrix of the confidential document to compute common elements between them and creates a common matrix of the check target text and the confidential document on the basis of the computation result. By generating the common matrix, it turns out that there is combination information common to the check target text and the confidential document, in other words, a pair of keywords (pair of hash values) that is common within the range of the predetermined number of characters.

Specifically, the common matrix creating unit 161 selects a confidential document, which does not have the similarity with the check target text, from the plurality of confidential documents stored in the feature element matrix DB 240 and restores the serialized feature element matrix of the selected confidential document in the format of matrix and generates an original feature element matrix.

Moreover, the common matrix creating unit 161 computes the logical product of the feature element matrix of the generated confidential document and the feature element matrix of the check target text. The common matrix creating unit 161 creates a common matrix on the basis of the computation result. The common matrix creating unit 161 then outputs the created common matrix to the number-of-common-elements computing unit 162 and the number-of-three-continuous-hash-values computing unit 164.

When acquiring the common matrix from the common matrix creating unit 161, the number-of-common-elements computing unit 162 computes the number (the number of common elements) of specific values "1" that are common elements included in the common matrix and outputs the computed number of common elements to the number-of-common-elements determining unit 163.

When acquiring the number of common elements from the number-of-common-elements computing unit 162, the number-of-common-elements determining unit 163 determines whether the acquired number of common elements is not less than a predetermined value.

For example, the predetermined value is "3". However, the predetermined value may be a numeric value by which the possibility of similarity between the check target text and the confidential document is admitted. The predetermined value is previously checked by an experiment or the like and is stored in the storage unit 20.

When it is determined that the number of common elements is not less than the predetermined value, the number-of-common-elements determining unit 163 determines that there is the possibility of similarity between the confidential document and the check target text and informs the number-of-three-continuous-hash-values computing unit 164 of the effect that there is the possibility of similarity between documents.

On the other hand, when it is determined that the number of common elements is less than the predetermined value, the number-of-common-elements determining unit 163 determines that there is not the possibility of similarity between the check target text and the confidential document and informs the similarity determining unit 170 of the effect that there is not the possibility of similarity between documents.

In this case, the processes of the common matrix creating unit 161, the number-of-common-elements computing unit 162, and the number-of-common-elements determining unit 163 correspond to "similarity check 1" between the check target text and the confidential document.

Figure 8A:
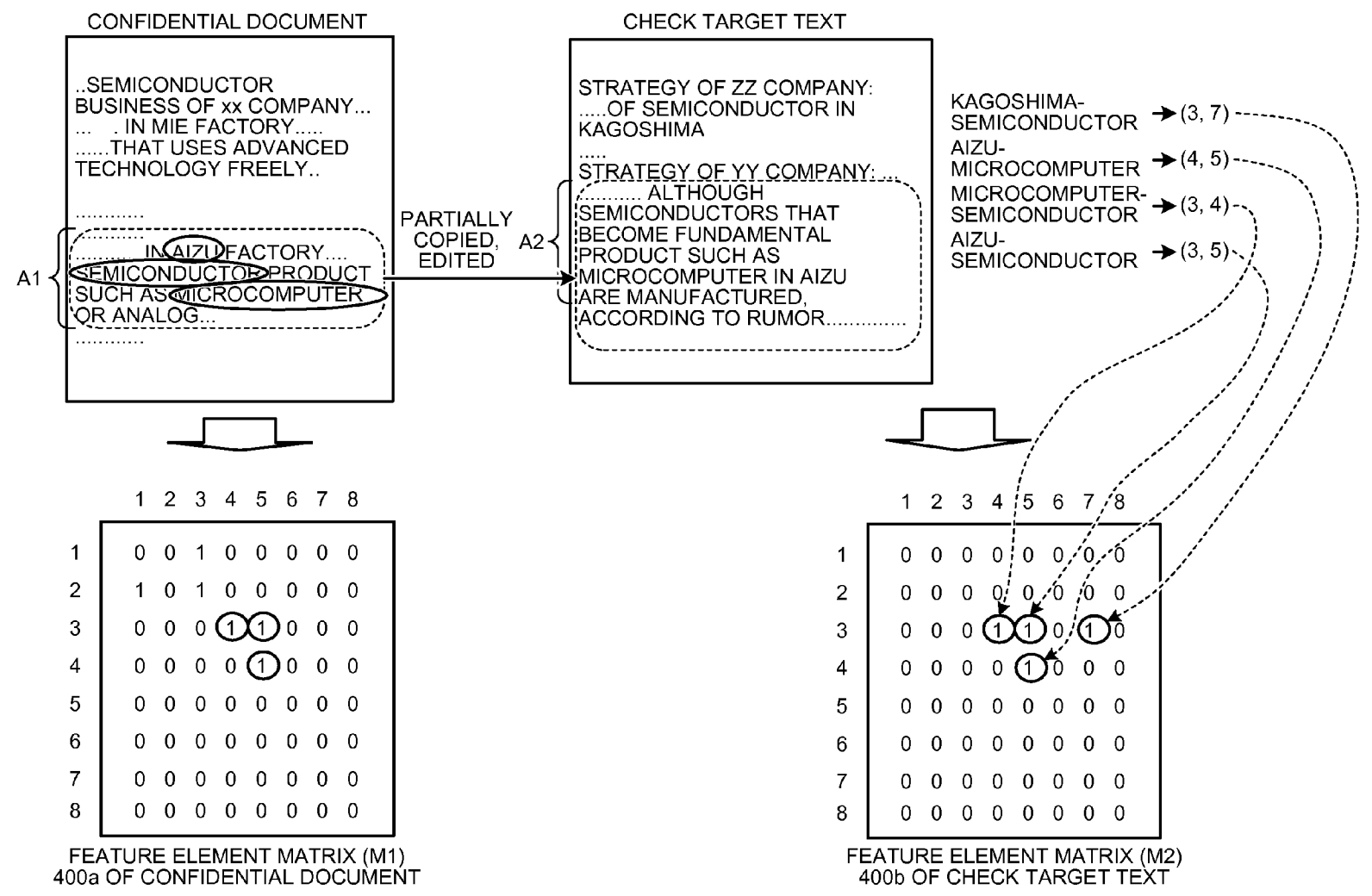

Now, it will be explained about the similarity check of "similarity check 1" with reference to FIGS. 8A and 8B. FIGS. 8A and 8B are diagrams illustrating an example of the similarity check of "similarity check 1". First, in the example of FIG. 8A, it is assumed that a feature element matrix (M1) 400a of a confidential document and a feature element matrix (M2) 400b of a check target text are illustrated and the check target text includes an A2 part in which an A1 part of the confidential document is partially copied and is edited.

In the example of FIG. 8A, the check target text includes, within the range of the predetermined number of characters, a pair of a keyword "Kagoshima" (hash value 7) and a keyword "semiconductor" (hash value 3), a pair of a keyword "Aizu" (hash value 5) and a keyword "microcom- puter" (hash value 4), a pair of the keyword "microcomputer" (hash value 4) and the keyword "semiconductor" (hash value 3), and a pair of the keyword "Aizu" (hash value 5) and the keyword "semiconductor" (hash value 3). As a result, the feature element matrix (M2) 400b of the check target text sets the specific value "1" to matrix elements (3, 7), (4, 5), (3, 4), and (3, 5).

In this case, the feature element matrix (M1) 400a of the confidential document is a matrix that is obtained by restoring the serialized values of one confidential document stored in the feature element matrix DB 240 in the format of matrix.

Next, in FIG. 8B, there is illustrated a common matrix (M3) 400c that indicates the result of a logical product of the feature element matrix (M1) 400a of the confidential document and the feature element matrix (M2) 400b of the check target text. The matrix elements having the specific value "1" included in the common matrix (M3) 400c are the pairs of hash values common to the confidential document and the check target text.

In the example of FIG. 8B, the matrix elements of (3, 4), (3, 5), and (4, 5) that are located in a B1 part of the common matrix (M3) 400c are the pairs of hash values common to the confidential document and the check target text. The number of common elements becomes three. At this time, the number-of-common-elements determining unit 163 determines whether the number of common elements is not less than a predetermined value. When the predetermined value is three, the number-of-common-elements determining unit 163 determines that there is the possibility of similarity between documents.

Returning to FIG. 2, when the number-of-three-continuous-hash-values computing unit 164 acquires the notification of the effect that there is the possibility of similarity between documents from the number-of-common-elements determining unit 163 and acquires the common matrix from the common matrix creating unit 161, the number-of-three-continuous-hash-values computing unit 164 computes the number of three continuous hash values that appears within the same range of the predetermined number of characters by using the acquired common matrix.

It is assumed that three continuous hash values mean a group of combination information combined from three hash values that appear within the range of the predetermined number of characters in each of the check target text and the confidential document and continuously appear in the sequence of the same arrangement.

Now, it will be explained about three continuous hash values with reference to FIG. 9A. FIG. 9A is a diagram illustrating an example of three continuous hash values. In FIG. 9A, it is assumed that each of the check target text and the confidential document includes keywords in the sequence of arrangement of "Aizu" (hash value 5), "microcomputer" (hash value 4), and "semiconductor" (hash value 3) within the range of the predetermined number of characters. For convenience of explanation, it is assumed that the common matrix is eight rows and eight columns.

As illustrated in FIG. 9A, because the keywords continuously appear in the sequence of arrangement of "Aizu" (hash value 5), "microcomputer" (hash value 4), "semiconductor" (hash value 3) within the range of the predetermined number of characters of the document, the pairs of keywords are "Aizu"-"microcomputer", "Aizu"-"semiconductor", and "microcomputer"-"semiconductor".

As a result, matrix elements become (4, 5), (3, 5), and (3, 4) and the common matrix 400c in which the specific value "1" is set to these matrix elements is configured. These matrix elements are collectively referred to as one group of three continuous hash values.

In general, because the number of three keywords of consecutive arrangement within the range of the predetermined number of characters is large if two objects are similar, the number of three continuous hash values also increases. Therefore, the number-of-three-continuous-hash-values computing unit 164 computes the number of three continuous hash values by using the common matrix 400c and determines whether the two objects are similar by using the number of three continuous hash values to be described below.

Specifically, the number-of-three-continuous-hash-values computing unit 164 computes the number of specific values "1" for each column of the common matrix in order to retrieve a plurality of other keywords within the range of the predetermined number of characters from the determination target keywords. Moreover, the number-of-three-continuous-hash-values computing unit 164 takes out hash values that indicates the positions of rows having the specific value "1" for the columns having two or more specific values "1". The hash values become hash values of the plurality of other keywords within the range of the predetermined number of characters from the determination target keywords.

Moreover, when it is assumed that the combination of different two hash values among the taken plurality of hash values is a matrix element and the matrix element is the specific value "1", it leads to have one three-continuous-hash-value within the range of the predetermined number of characters. The number-of-three-continuous-hash-values computing unit 164 adds one to the number of three continuous hash values.

When acquiring the number of three continuous hash values from the number-of-three-continuous-hash-values computing unit 164, the number-of-three-continuous-hash-values determining unit 165 determines whether the acquired number of three continuous hash values is not less than a predetermined value. For example, the predetermined value is "1". However, the predetermined value may be a numeric value by which the possibility of similarity between the check target text and the confidential document is admitted. The predetermined value is previously checked by an experiment or the like and is stored in the storage unit 20.

When it is determined that the number of three continuous hash values is not less than the predetermined value, the number-of-three-continuous-hash-values determining unit 165 determines that the confidential document and the check target text are similar to each other and informs the similarity determining unit 170 of the effect that the documents are similar to each other. On the other hand, when it is determined that the number of three continuous hash values is less than the predetermined value, the number-of-three-continuous-hash-values determining unit 165 determines that the check target text and the confidential document are not similar to each other and informs the similarity determining unit 170 of the effect that there is not the possibility of similarity between documents.

It should be noted that the processes of the number-of-three-continuous-hash-values computing unit 164 and the number-of-three-continuous-hash-values determining unit 165 described above become "similarity check 2" between the check target text and the confidential document.

Figure 9B:
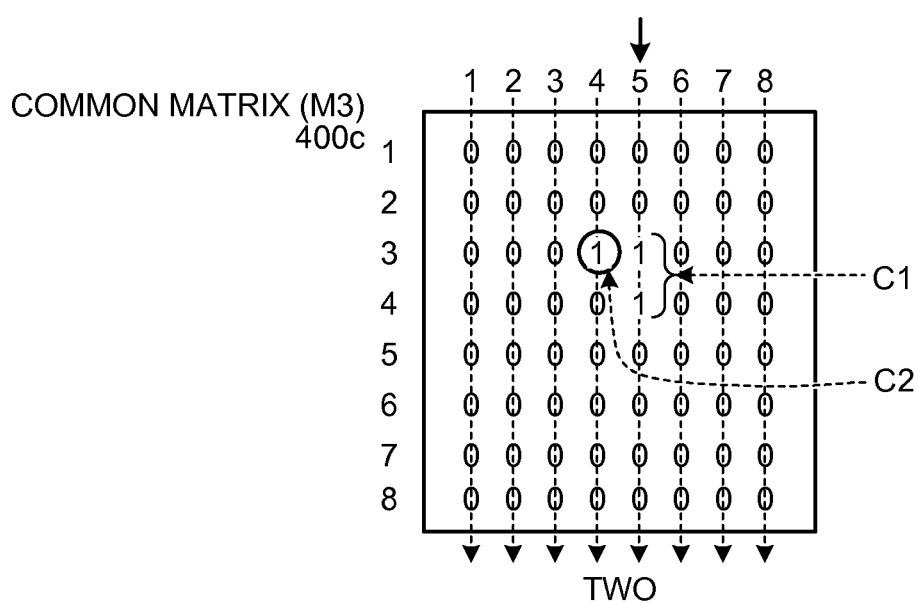
FIG. 9B is a diagram illustrating an example of the similarity check of a similarity check 2.

Now, it will be explained about the similarity check of "similarity check 2" with reference to FIG. 9B. FIG. 9B is a diagram illustrating an example of the similarity check of "similarity check 2". As illustrated in FIG. 9B, because the number of specific values "1" is computed for each column of the common matrix (M3) 400c and a column having two or more specific values "1" is the fifth column, hash values that indicate the positions of rows of a matrix element (C1) having the specific value "1" are "3" and "4".

In other words, the hash values "3" and "4" are hash values of the plurality of other keywords that are within the range of the predetermined number of characters from the determination target keyword having the hash value "5". As a result, between the confidential document and the check target text, it turns out that the proximity relationships of "5"→"4" and "5"→"3" are within the range of the predetermined number of characters regardless of the identity and difference of the starting position of the keyword having the hash value "5".

Next, because a matrix element (3, 4) (C2) has the specific value "1" among the matrix elements (3, 4) and (4, 3) obtained by combining the taken plurality of hash values "3" and "4", it turns out that the proximity relationship of "4"→"3" is within the range of the predetermined number of characters.

Then, it turns out that the consecutive arrangement of "5"→"4"→"3" is within the range of the predetermined number of characters. Therefore, three continuous hash values are retrieved and the number becomes one. The number-of-three-continuous-hash-values determining unit 165 determines whether the number of three continuous hash values is not less than the predetermined value. When the predetermined value is one, the number-of-three-continuous-hash-values determining unit 165 determines that the documents have a similarity between each other.

When acquiring various types of notifications from the number-of-common-elements determining unit 163 and the number-of-three-continuous-hash-values determining unit 165, the similarity determining unit 170 sequentially determines whether the check target text and the confidential document are similar to each other for each confidential document in accordance with the acquired notifications.

Specifically, when acquiring the effect that there is not the possibility of similarity between documents from the number-of-common-elements determining unit 163 or the number-of-three-continuous-hash-values determining unit 165, the similarity determining unit 170 informs the common matrix creating unit 161 of the effect that the next confidential document is selected when a confidential document on which similarity determination is not performed remains.

Moreover, when acquiring the effect that there is not the possibility of similarity between documents from the number-of-common-elements determining unit 163 or the number-of-three-continuous-hash-values determining unit 165, the similarity determining unit 170 informs the mail transmitting unit 190 of a mail transmission request when a confidential document on which the similarity determination with the check target text is not performed does not remains. On the other hand, when acquiring the effect that the documents are similar to each other from the number-of-three-continuous-hash-values determining unit 165, the similarity determining unit 170 informs the mail transmission rejecting unit 180 of the transmission rejection request for the mail.

When acquiring the transmission rejection request for the mail from the similarity determining unit 170, the mail transmission rejecting unit 180 blocks the transmission of the mail acquired from the mail receiving unit 110.

When acquiring the mail transmission request from the feature element matrix adding unit 140 or the similarity determining unit 170, the mail transmitting unit 190 transmits the mail acquired from the mail receiving unit 110 to the transmission destination of the mail.

In regard to "similarity check 1", it has been explained as premises for associating one keyword with a unique hash value. However, the hash values of different keywords can accidentally collide with the probability of [1/the maximum number of hash values].

In the case of "similarity check 1", because a similarity between documents is determined by using common elements between the check target text and the check document, in other words, a pair of common hash values, incorrect determination can be performed on the similarity between documents. Therefore, it is necessary to use "similarity check 2" for determining a similarity between documents by using three continuous hash values within the range of the predetermined number of characters.

Now, it will be explained about the necessity of "similarity check 2" with reference to FIG. 9C. FIG. 9C is a diagram illustrating the necessity of "similarity check 2". As illustrated in FIG. 9C, when keywords included in a check document T1 and keywords included in a confidential document T3 unrelated to the check document T1 accidentally have the same hash values, it can be determined by mistake that the check document T1 and the confidential document T3 have similarity.

In the example of FIG. 9C, it is assumed that both of the keyword "semiconductor" included in the check document T1 and the keyword "fishing" included in the confidential document T3 have a hash value "3". In this case, when the same keyword "Mie" (hash value 1) is within the range of the predetermined number of characters from the appearance position of each of the keywords, the matrix element (1, 3) of each feature element matrix is set to the specific value "1".

Then, because the common element (1, 3) of the common matrix is set to the specific value "1", the number of common elements is consequently incremented by one. As a result, incorrect similarity determination can be performed by only "similarity check 1" for determining a similarity between documents by using the number of common elements. Therefore, to surely determine a similarity between documents, "similarity check 2" checks whether a pair of three hash values (three continuous hash values) of 3-1, 1-2, and 2-3 exists or not in the arrangement of the keywords "semiconductor" (hash value 3), "Mie" (hash value 1), and "advanced" (hash value 2).

Furthermore, in the example of FIG. 9C, the hash values of "advanced" and "pearl" can be accidentally identical to each other in addition to the hash values of "semiconductor" and "fishing". However, a probability by which two documents are accidentally identical to each other in this way is 1/((the maximum number of hash values)×(the maximum number of hash values)) that is extremely low. Therefore, it is considered that the accidental accordance probability of three continuous hash values is extremely low.

Moreover, the pair of three hash values of 3-1, 1-2, and 2-3 does not exist within the range of the predetermined number of characters, but can accidentally exist discretely at discrete positions inside the document in the arrangement of the keywords "semiconductor" (hash value 3), "Mie" (hash value 1), and "advanced" (hash value 2). In this case, it results in the appearance of three continuous hash values by mistake. Thus, it can be considered that similarity exists between the documents. On the contrary, if keywords between documents are identical to each other, it may be considered that similarity exists between the documents.

Figure 10:
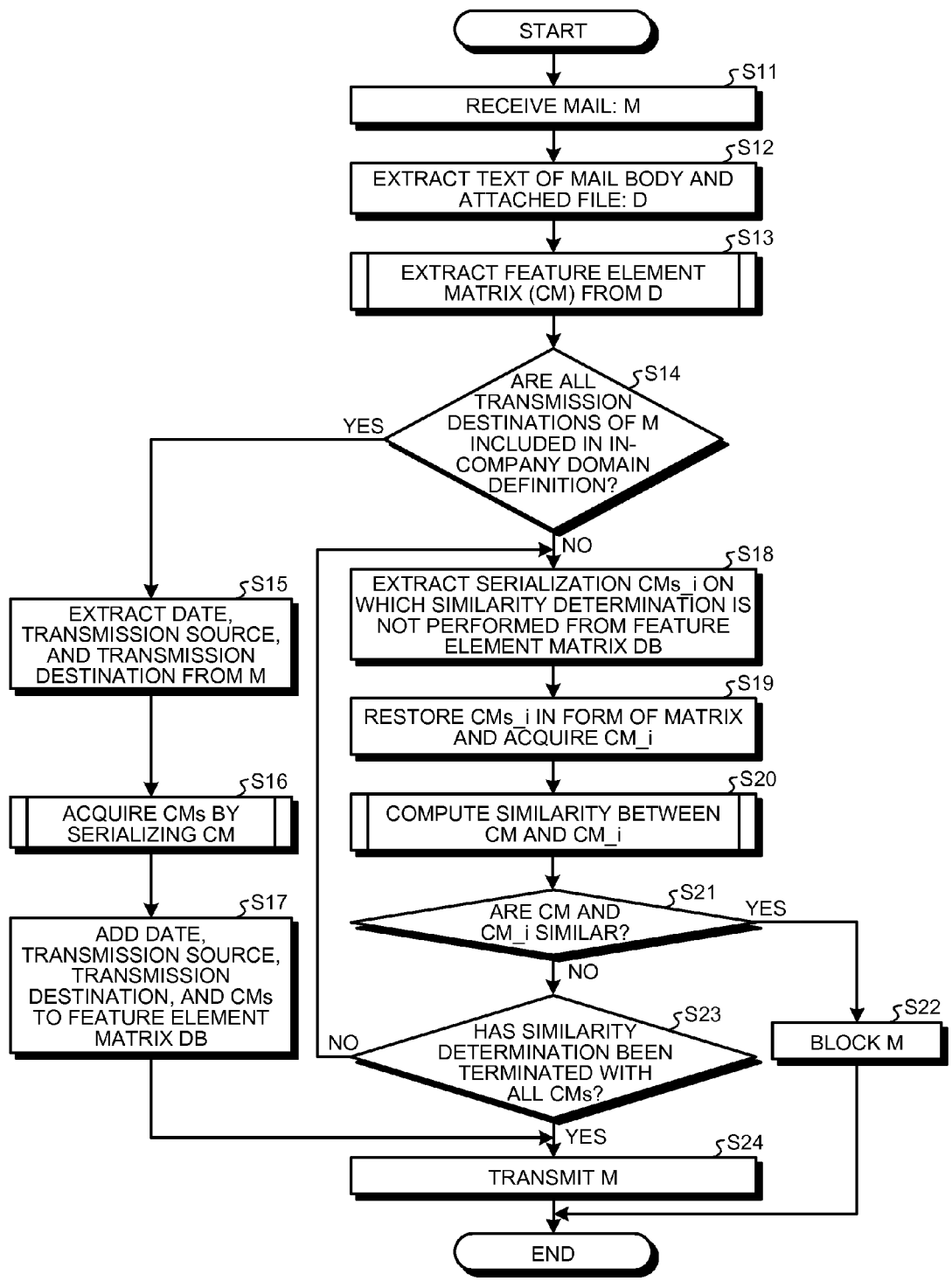
FIG. 10 is a flowchart illustrating the processing procedure of a document checking process performed by the document checking apparatus according to the first embodiment.

Document Checking Process of Document Checking Apparatus According to First Embodiment Next, it will be explained about a document checking process of the document checking apparatus according to the first embodiment with reference to FIG. 10. FIG. 10 is a flowchart illustrating the processing procedure of a document checking process of the document checking apparatus according to the first embodiment. It is assumed that a feature element matrix (CM) is a two-dimensional square matrix that is configured by setting the number of rows as MaxS and the number of columns as MaxS.

First, a mail (M) transmitted from the in-company client PC is received by the mail receiving unit 110 (S11). Then, the mail receiving unit 110 extracts the body text of the mail (M) and a text included in an attached file attached to the mail (M) as a check target text (D) from the received mail (M) (S12). Then, the mail receiving unit 110 outputs the extracted check target text (D) to the feature element matrix extracting unit 120 and outputs the extracted body text of the mail (M) to the in-company domain determining unit 130.

The feature element matrix extracting unit 120 extracts the feature element matrix (CM) from the check target text (D) output from the mail receiving unit 110 (S13). The feature element matrix extracting unit 120 then outputs the extracted feature element matrix to the in-company domain determining unit 130.

Then, after acquiring the feature element matrix from the feature element matrix extracting unit 120, the in-company domain determining unit 130 determines whether all transmission destination domains included in the body text of the mail (M) are included in in-company domains stored in the in-company domain definition 230 (S14).

When it is determined that all the transmission destination domains included in the body text of the mail (M) are included in the in-company domains stored in the in-company domain definition 230 (S14: Yes), the in-company domain determining unit 130 outputs the feature element matrix (CM) and the body text of the mail (M) to the feature element matrix adding unit 140.

Then, when acquiring the body text of the mail (M) from the in-company domain determining unit 130, the feature element matrix adding unit 140 extracts a reception date of the mail (M), a transmission source, and a transmission destination from the acquired body text of the mail (M) (S15).

After that, when acquiring the feature element matrix (CM) from the in-company domain determining unit 130, the feature element matrix adding unit 140 acquires a serialization result (CMs) that is obtained by serializing the acquired feature element matrix (CM) by the serializing unit 150 (S16).

Then, the feature element matrix adding unit 140 adds the reception date of the mail (M), the transmission source, the transmission destination, and the serialization result (CMs) as one record to the feature element matrix DB 240 (S17). After that, the feature element matrix adding unit 140 outputs a mail transmission request to the mail transmitting unit 190.

On the other hand, when it is determined that any transmission destination domain included in the body text of the mail (M) is not included in the in-company domains stored in the in-company domain definition 230 (S14: No), the in-company domain determining unit 130 determines that an out-company domain is included in the transmission destination domains and outputs the feature element matrix (CM) to the common matrix creating unit 161.

Continuously, when acquiring the feature element matrix (CM) from the in-company domain determining unit 130, the common matrix creating unit 161 selects a record for a confidential document, on which similarity determination with the check target text (D) is not performed, from the feature element matrix DB 240. The common matrix creating unit 161 then extracts serialization (CMs_i) of the feature element matrix from the selected record (S18).

Then, the common matrix creating unit 161 restores the extracted serialization (CMs_i) in the form of a matrix and generates a feature element matrix (CM_i) (S19).

After that, the similarity computing unit 160 computes a similarity between the feature element matrix (CM) of the check target text (D) acquired from the in-company domain determining unit 130 and the feature element matrix (CM_i) of the confidential document generated by the common matrix creating unit 161 (S20).

Then, the similarity determining unit 170 determines whether the feature element matrix (CM) of the check target text (D) and the feature element matrix (CM_i) of the confidential document are similar to each other on the basis of the computation result of similarity computed by the similarity computing unit 160 (S21).

As a result, when it is determined that the feature element matrix (CM) of the check target text (D) and the feature element matrix (CM_i) of the confidential document are similar to each other (S21: Yes), the similarity determining unit 170 outputs a transmission rejection request for the mail to the mail transmission rejecting unit 180. After acquiring the transmission rejection request for the mail from the similarity determining unit 170, the mail transmission rejecting unit 180 blocks the mail (M) including the check target text (D) (S22).

On the other hand, when it is determined that the feature element matrix (CM) of the check target text (D) and the feature element matrix (CM_i) related to the confidential document is not similar to each other (S21: No), the similarity determining unit 170 determines whether similarity determination between the check target text (D) and all the confidential documents stored in the feature element matrix DB 240 has been terminated (S23).

Then, when it is determined that similarity determination between the check target text (D) and all the confidential documents stored in the feature element matrix DB 240 has not been terminated (S23: No), the similarity determining unit 170 moves the process control to S18 to perform similarity determination between the check target text (D) and confidential documents on which similarity determination is not performed.

On the other hand, when it is determined that similarity determination between the check target text (D) and all the confidential documents stored in the feature element matrix DB 240 has been terminated (S23: Yes), the similarity determining unit 170 determines that the check target text (D) does not have similarity with all the confidential documents and outputs a mail transmission request to the mail transmitting unit 190. After acquiring the mail transmission request from the similarity determining unit 170, the mail transmitting unit 190 transmits the mail (M) to the transmission destination that is an external address (S24).

Figure 11:
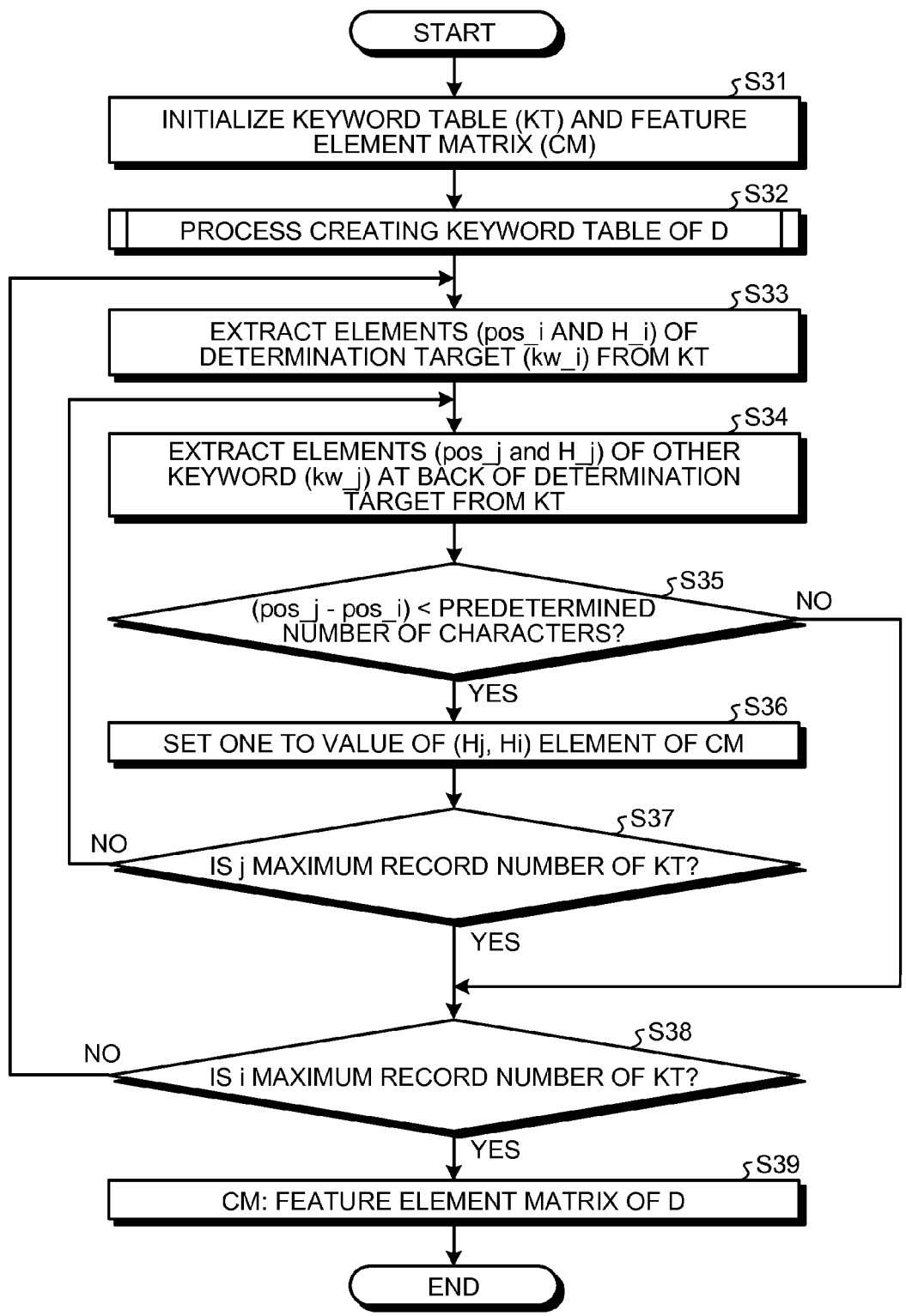
FIG. 11 is a flowchart illustrating the processing procedure of a feature element matrix extracting unit according to the first embodiment.

Next, it will be explained about the processing procedure of S13 illustrated in FIG. 10 with reference to FIG. 11. FIG. 11 is a flowchart illustrating the processing procedure of the feature element matrix extracting unit 120 according to the first embodiment.

When the check target text (D) is output to the keyword appearance position extracting unit 121 by the feature element matrix extracting unit 120, the keyword appearance position extracting unit 121 initializes the keyword table (KT) 210 and the feature element matrix (the work matrix 250) (CM) (S31).

Then, the keyword appearance position extracting unit 121 creates the keyword table (KT) 210 of the check target text (D) (S32).

Continuously, when the notification of the effect that the keyword table (KT) 210 is created is output to the presence-or-absence-in-keyword-range determining unit 123 by the keyword appearance position extracting unit 121, the presence-or-absence-in-keyword-range determining unit 123 selects a record for a keyword (kw_i) that is a determination target from the keyword table (KT) 210. Then, the presence-or-absence-in-keyword-range determining unit 123 extracts an appearance position (pos_i) and a hash value (H_i) of the keyword (kw_i) from the selected record (S33).

Moreover, the presence-or-absence-in-keyword-range determining unit 123 selects a record for another keyword (kw_j) of which the appearance position is located more backward than the determination target keyword from the keyword table (KT). Then, the presence-or-absence-in-keyword-range determining unit 123 extracts an appearance position (pos_j) and a hash value (H_j) of the other keyword (kw_j) from the selected record (S34).

Then, the presence-or-absence-in-keyword-range determining unit 123 determines whether the appearance position (pos_j) of the other keyword (kw_j) is within the predetermined number of characters from the appearance position (pos_i) of the determination target keyword (S35).

As a result, when it is determined that the appearance position (pos_j) of the other keyword (kw_j) is within the range of the predetermined number of characters from the appearance position (pos_i) of the determination target keyword (S35: Yes), the presence-or-absence-in-keyword-range determining unit 123 outputs a matrix element, which is obtained by associating the hash value (Hi) of the determination target keyword (kw_i) with a column and the hash value (Hj) of the other keyword (kw_j) with a row, to the feature element matrix creating unit 124. Then, the feature element matrix creating unit 124 sets the matrix element of the feature element matrix (CM) to the specific value "1" (S36).

Then, the feature element matrix creating unit 124 determines whether the record for the other keyword (kw_j) is the maximum record of the keyword table (KT) 210 (S37). When it is determined that it is not the maximum record (S37: No), the feature element matrix creating unit 124 moves the process control to S34 to make the presence-or-absence-in-keyword-range determining unit 123 select a record including the next other keyword.

On the other hand, when it is determined that the appearance position (pos_j) of the other keyword (kw_j) is not within the range of the predetermined number of characters from the appearance position (pos_i) of the determination target keyword (S35: No) or when it is determined that the record for the other keyword (kw_j) is the maximum record (S37: Yes), the feature element matrix creating unit 124 determines whether the record for the determination target keyword (kw_i) is the maximum record of the keyword table (KT) 210 (S38).

Then, when it is determined that the record for the determination target keyword (kw_i) is not the maximum record of the keyword table (KT) 210 (S38: No), the feature element matrix creating unit 124 moves the process control to S33 to make the presence-or-absence-in-keyword-range determining unit 123 select a record including the next determination target keyword.

On the other hand, when it is determined that the record for the determination target keyword (kw_i) is the maximum record of the keyword table (KT) 210 (S38: Yes), the feature element matrix creating unit 124 completes the generation of the feature element matrix (D) and returns the feature element matrix (D) to the feature element matrix extracting unit 120 (S39).

Figure 12:
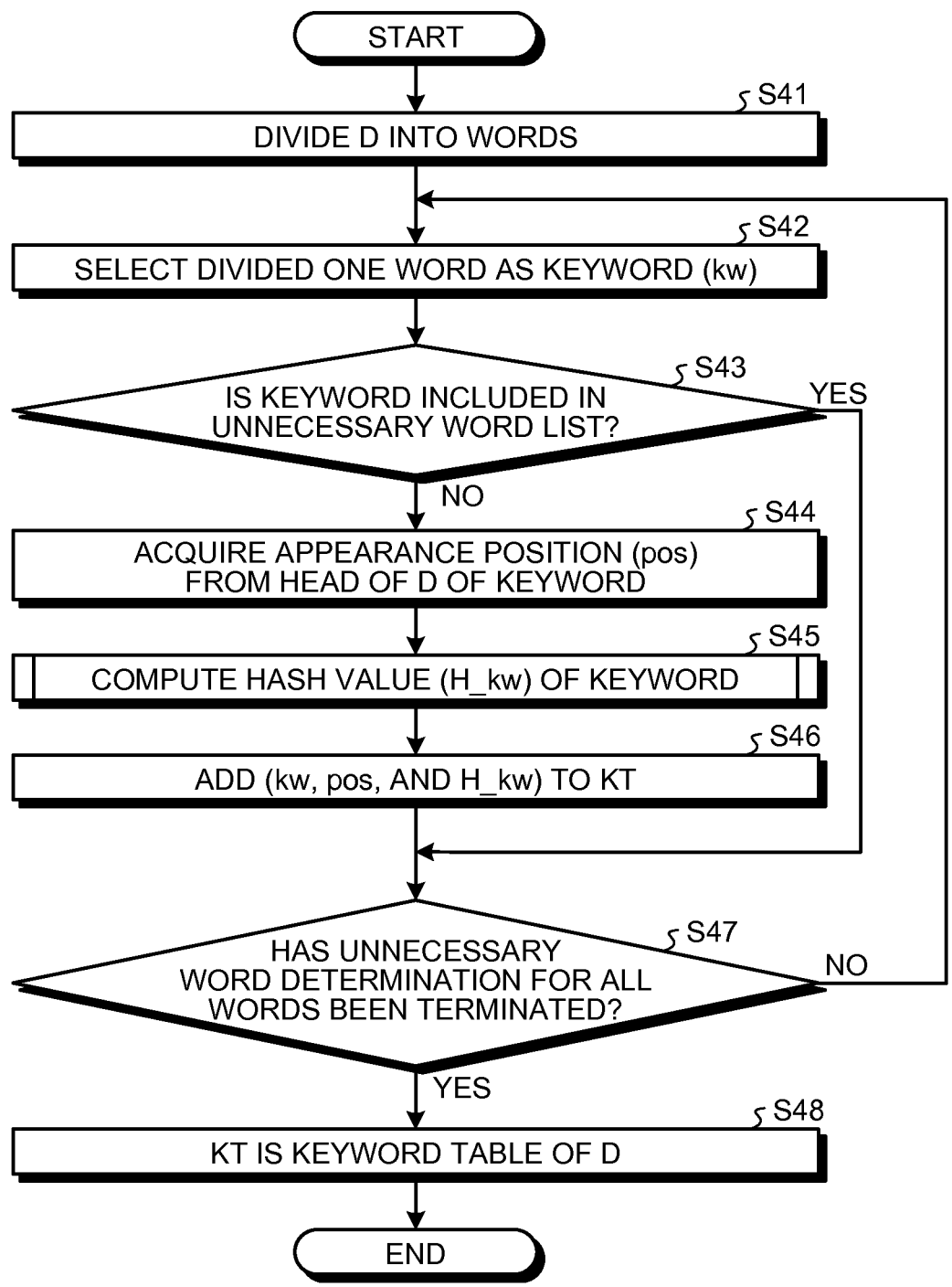
FIG. 12 is a flowchart illustrating the processing procedure of a keyword table creating process according to the first embodiment.

Next, it will be explained about the processing procedure of S32 illustrated in FIG. 11 with reference to FIG. 12. FIG. 12 is a flowchart illustrating the processing procedure of the keyword table creating process according to the first embodiment.

First, the keyword appearance position extracting unit 121 divides the check target text (D) into words (S41). At this time, the keyword appearance position extracting unit 121 may divide the check target text (D) into words that is the character string of the minimum unit having a meaning as a language. For example, a morphological analysis may be performed on the check target text.

Then, the keyword appearance position extracting unit 121 selects one keyword (kw) by using each of the divided words as a keyword (S42) and determines whether the selected keyword (kw) is included in the unnecessary word list 220 (S43).

When it is determined that the keyword (kw) is not included in the unnecessary word list 220 (S43: No), the keyword appearance position extracting unit 121 acquires an appearance position (pos) of the keyword (kw) from the head of the check target text (D) (S44).

Moreover, the keyword appearance position extracting unit 121 outputs the keyword (kw) to the hash value computing unit 122 and acquires a hash value (H_kw) for the output keyword (kw) from the hash value computing unit 122 (S45).

Then, the keyword appearance position extracting unit 121 adds the selected keyword (kw), the appearance position (pos), and the hash value (H_kw), as one record, to the keyword table (KT) 210 (S46).

Then, after the keyword appearance position extracting unit 121 adds the selected keyword (kw) to the keyword table (KT) 210 or when it is determined that the keyword (kw) is included in the unnecessary word list 220 (S43: Yes), the keyword appearance position extracting unit 121 determines whether unnecessary word determination for all words has been terminated (S47).

As a result, when it is determined that unnecessary word determination for all words is not terminated (S47: No), the keyword appearance position extracting unit 121 moves the process control to S42 to select the next word. On the other hand, when it is determined that unnecessary word determination for all words is terminated (S47: Yes), the keyword appearance position extracting unit 121 completes the generation of the keyword table (KT) 210 (S48).

Figure 13:
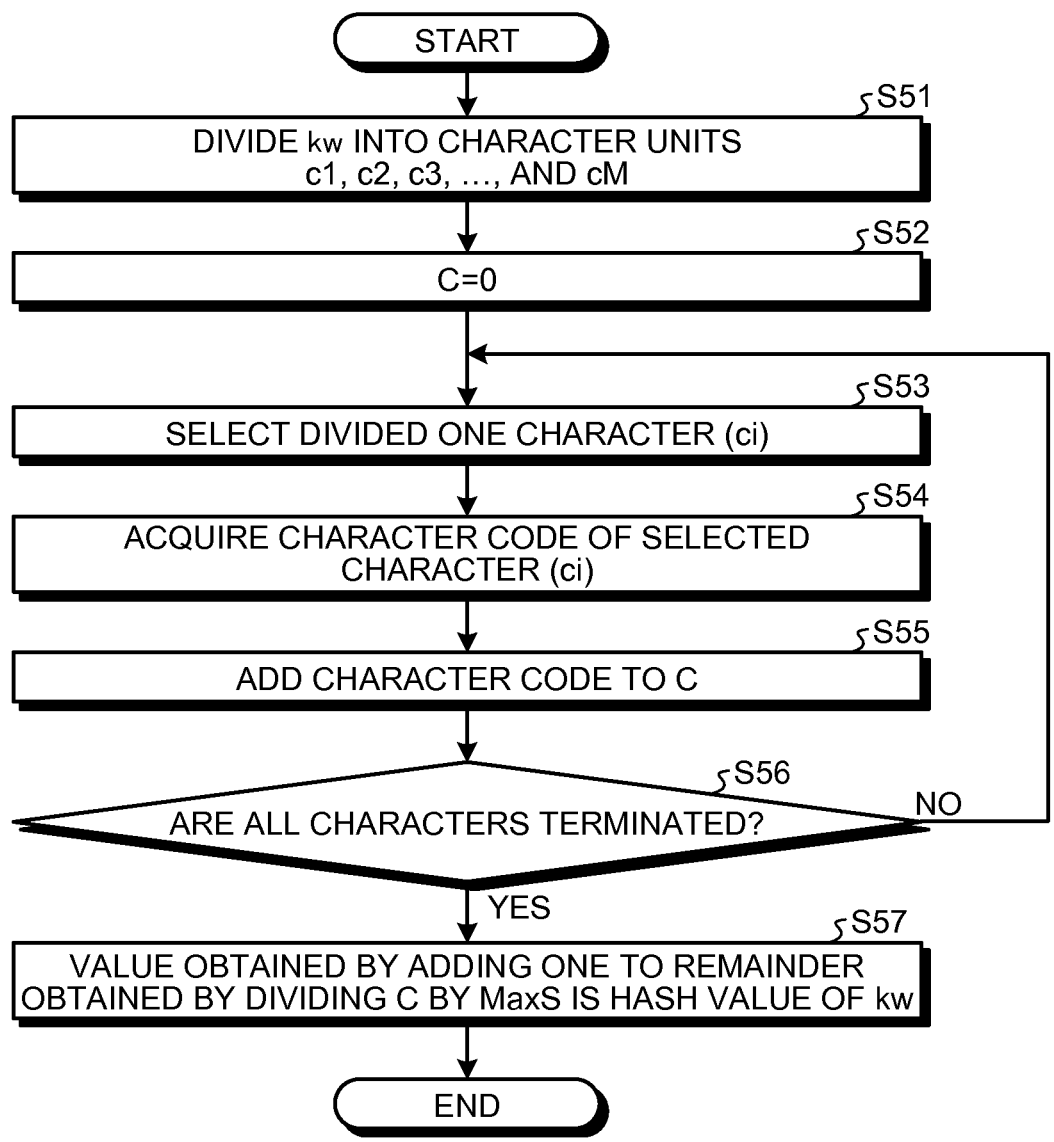
FIG. 13 is a flowchart illustrating the processing procedure of a hash value computing unit according to the first embodiment.

Next, it will be explained about the processing procedure of S45 illustrated in FIG. 12 with reference to FIG. 13. FIG. 13 is a flowchart illustrating the processing procedure of the hash value computing unit 122 according to the first embodiment. In the example of FIG. 13, as a method for computing a hash value, the hash value computing unit 122 employs a method for adding one to a remainder value that is obtained dividing a value obtained by adding all character codes of characters constituting a keyword by the maximum hash value.

First, when the keyword (kw) is output to the hash value computing unit 122 by the keyword appearance position extracting unit 121, the hash value computing unit 122 divides the keyword (kw) into character units (for example, c1, c2, c3, . . . , and cM) (S51).

Then, the hash value computing unit 122 sets zero to a count (C) indicating a result value obtained by adding character codes to initialize the count (S52).

Next, the hash value computing unit 122 selects one character (ci) from the divided characters (S53).

Continuously, the hash value computing unit 122 acquires the character code of the selected character (ci) (S54).

Then, the hash value computing unit 122 adds the acquired character code to the count (C) (S55).

After that, the hash value computing unit 122 determines whether the addition has been performed on the character codes of all the divided characters (ci (i=1 to M)) (S56). Then, when it is determined that the addition has not been performed on the character codes of all the characters (S56: No), the hash value computing unit 122 moves the process control to S53 to select the next character.

On the other hand, when it is determined that the addition has been performed on the character codes of all the characters (S56: Yes), the hash value computing unit 122 divides the count (C) by the maximum hash value (MaxS) and computes a value obtained by adding +1 to its remainder value (S57). As a result, the computed value becomes the hash value of the keyword (kw). The hash value computing unit 122 then returns the computed hash values to the keyword appearance position extracting unit 121.

Figure 14:
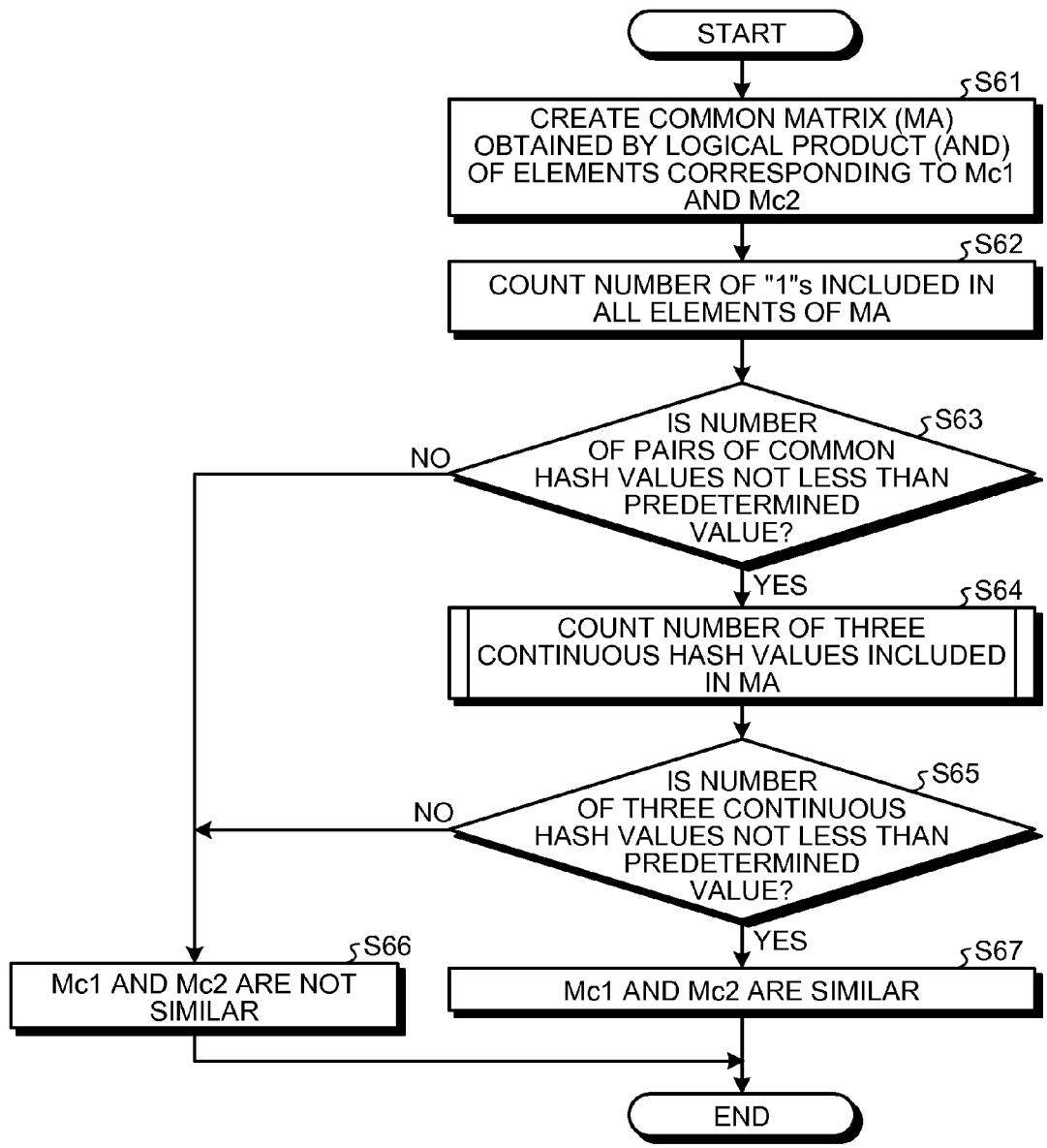
FIG. 14 is a flowchart illustrating the processing procedure of a similarity computing unit according to the first embodiment.

Next, it will be explained about the processing procedure of S20 illustrated in FIG. 10 with reference to FIG. 14. FIG. 14 is a flowchart illustrating the processing procedure of the similarity computing unit 160 according to the first embodiment.

First, the common matrix creating unit 161 computes the logical product of a feature element matrix (Mc1) of the check target text (D) acquired from the in-company domain determining unit 130 and a feature element matrix (Mc2) of the generated confidential document, creates a common matrix (MA) (S61), and outputs the created common matrix (MA) to the number-of-common-elements computing unit 162.

Next, the number-of-common-elements computing unit 162 counts the number (the number of common elements) of specific values "1" that are common elements included in the matrix elements of the acquired common matrix (MA) (S62). As a result, because the number of common elements is the number of pairs of keywords common to the check target text (D) and the confidential document, it is expected that the number of pairs of hash values common to the check target text (D) and the confidential document is decided.

Then, the number-of-common-elements determining unit 163 determines whether the number of pairs of hash values common to the check target text (D) and the confidential document is not less than a predetermined value (S63). Then, when it is determined that the number of hash values is not less than the predetermined value (S63: Yes), the number-of-common-elements determining unit 163 determines that there is the possibility of similarity between the confidential document and the check target text and outputs the effect that there is the possibility of similarity between the documents to the number-of-three-continuous-hash-values computing unit 164. On the other hand, when it is determined that the number of hash values is less than the predetermined value (S63: No), the number-of-common-elements determining unit 163 determines that there is not the possibility of similarity between the check target text (D) and the confidential document and informs the similarity determining unit 170 of the effect that there is not the possibility of similarity between the documents (S66).

After acquiring the effect that there is the possibility of similarity between the documents from the number-of-common-elements determining unit 163, the number-of-three-continuous-hash-values computing unit 164 counts the number of three continuous hash values included in the common matrix (MA) (S64).

Then, the number-of-three-continuous-hash-values determining unit 165 determines whether the number of three continuous hash values is not less than a predetermined value (S65). Then, when it is determined that the number of three continuous hash values is not less than the predetermined value (S65: Yes), the number-of-three-continuous-hash-values determining unit 165 informs the similarity determining unit 170 of the effect that the documents are similar to each other (S67).

On the other hand, when it is determined that the number of three continuous hash values is less than the predetermined value (S65: No), the number-of-three-continuous-hash-values determining unit 165 determines that there is not the possibility of similarity between the check target text (D) and the confidential document and informs the similarity determining unit 170 of the effect that there is not the possibility of similarity between the documents (S66).

Figure 15:
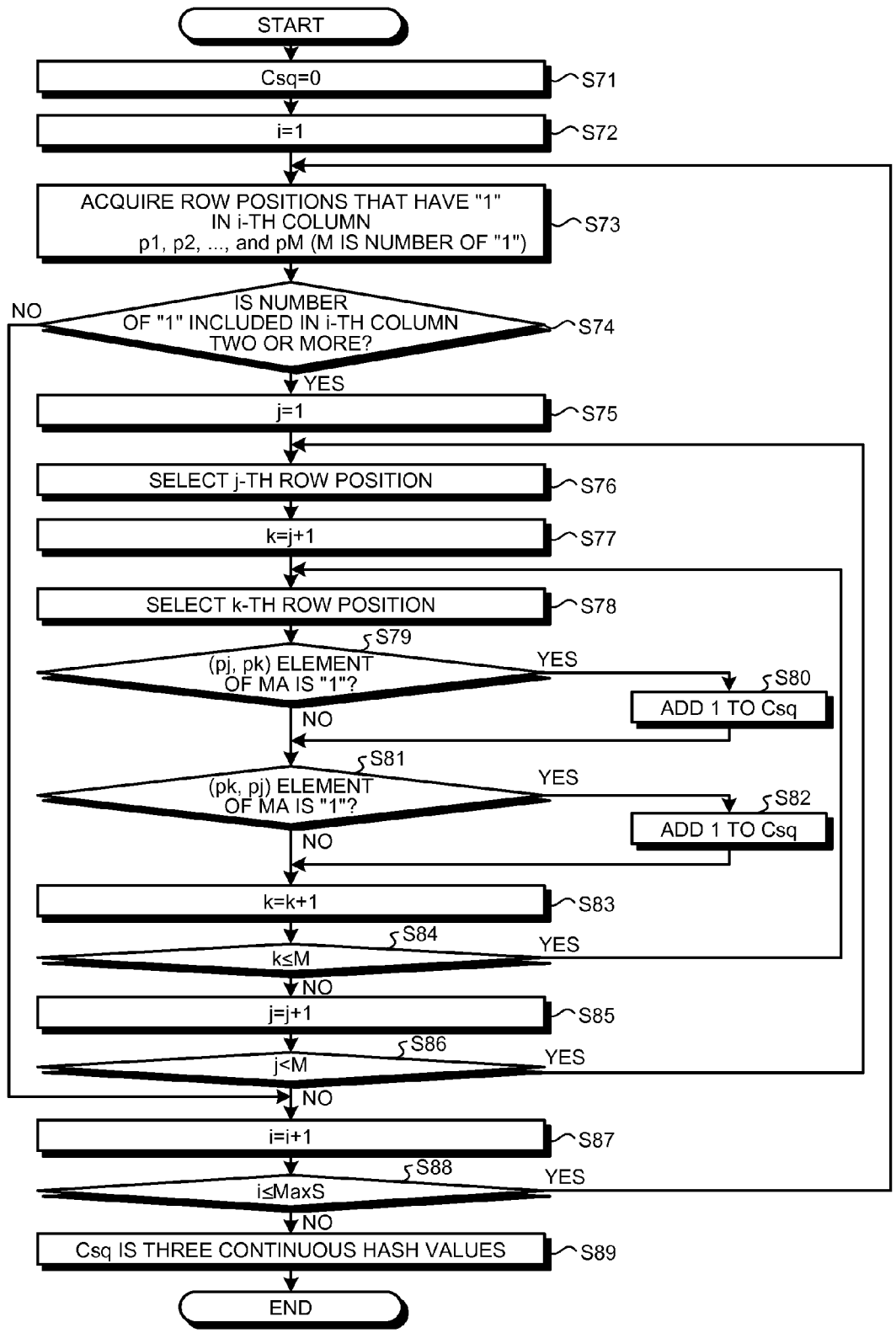
FIG. 15 is a flowchart illustrating the processing procedure of a number-of-three-continuous-hash-values computing unit according to the first embodiment.

Next, it will be explained about the processing procedure of S64 illustrated in FIG. 14 with reference to FIG. 15. FIG. 15 is a flowchart illustrating the processing procedure of the number-of-three-continuous-hash-values computing unit 164 according to the first embodiment.

First, the number-of-three-continuous-hash-values computing unit 164 sets zero to a count (Csq) to initialize the count (Csq) that indicates the number of three continuous hash values (S71) and sets one to "i" that indicates the position of column of the common matrix (MA) (S72). The column position (i-th column) indicated by "i" is identical to the hash value of a determination target keyword.

Then, the number-of-three-continuous-hash-values computing unit 164 acquires row positions (for example, p1, p2, p3, . . . , and pM) that have the specific value "1" in the i-th column from the common matrix (MA) (S73). The row positions are identical to the hash values of other keywords combined with the determination target keyword.

Continuously, the number-of-three-continuous-hash-values computing unit 164 determines whether the number of specific values "1" included in the i-th column is two or more (S74).

Then, when it is determined that the number of specific values "1" is two or more (S74: Yes), the number-of-three-continuous-hash-values computing unit 164 determines that the number of pairs of hash values of the determination target keyword and the other keywords is two or more. To determine whether it is three continuous hash values, the number-of-three-continuous-hash-values computing unit 164 sets one to an index "j" that indicates the position of the acquired row (S75).

Then, the number-of-three-continuous-hash-values computing unit 164 selects a row position (pj) indicated by the index "j" (S76). Moreover, the number-of-three-continuous-hash-values computing unit 164 sets "j+1" to an index "k" (S77) and selects a row position (pk) indicated by the index "k" (S78).

Then, the number-of-three-continuous-hash-values computing unit 164 determines whether the matrix element (pj, pk) of the common matrix (MA), which is obtained by setting the row position (pj) indicated by the index "j" as a row and setting the row position (pk) indicated by the index "k" as a column, is the specific value "1" (S79).

Then, when it is determined that the matrix element (pj, pk) is the specific value "1" (S79: Yes), the number-of-three-continuous-hash-values computing unit 164 determines that it is three continuous hash values adds +1 to the count (Csq) because two other keywords for the same determination target have the type of a pair of hash values (S80).

After adding +1 to the count (Csq) or when it is determined that the matrix element (pj, pk) is not the specific value "1" (S79: No), the number-of-three-continuous-hash-values computing unit 164 determines whether the matrix element (pk, pj) of the common matrix (MA), which is obtained by setting the row position (pj) indicated by the index "j" as a column and setting the row position (pk) indicated by the index "k" as a row, is the specific value "1" (S81).

Then, when it is determined that the matrix element (pk, pj) is the specific value "1" (S81: Yes), the number-of-three-continuous-hash-values computing unit 164 determines that it is three continuous hash values and adds +1 to the count (Csq) because two other keywords for the same determination target have the type of a pair of hash values (S82).

After adding +1 to the count (Csq) or when it is determined that the matrix element (pk, pj) is not the specific value "1" (S81: No), the number-of-three-continuous-hash-values computing unit 164 adds +1 to the index "k" (S83) and determines whether the index "k" is not more than the maximum number (M) of the acquired row positions (S84).

Then, when it is determined that the index "k" is not more than the maximum number (M) of the acquired row positions (S84: Yes), the number-of-three-continuous-hash-values computing unit 164 moves the process control to S78 to select the next row position.

On the other hand, when it is determined that the index "k" is larger than the maximum number (M) of the acquired row positions (S84: No), the number-of-three-continuous-hash-values computing unit 164 adds +1 to the index "j" (S85) and determines whether the index "j" is smaller than the maximum number (M) of the acquired row positions (S86).

Then, when it is determined that the index "j" is smaller than the maximum number (M) of the acquired row positions (S86: Yes), the number-of-three-continuous-hash-values computing unit 164 moves the process control to S76 to select the next row position.

On the other hand, when it is determined that the index "j" is not less than the maximum number (M) of the acquired row positions (S86: No), the number-of-three-continuous-hash-values computing unit 164 adds +1 to an index "i" (S87) and determines whether the column position "i" is not more than the maximum number (MaxS) of the columns of the common matrix MA (S88).

Then, when it is determined that the column position "i" is not more than the maximum number (MaxS) of the columns of the common matrix MA (S88: Yes), the number-of-three-continuous-hash-values computing unit 164 moves the process control to S73 to determine whether the next column has three continuous hash values.

On the other hand, when it is determined that the column position "i" is larger than the maximum number (MaxS) of the columns of the common matrix MA (S88: No), the number-of-three-continuous-hash-values computing unit 164 completes the computation of the count (Csq) because the number of three continuous hash values has been computed (S89).

Figure 16:
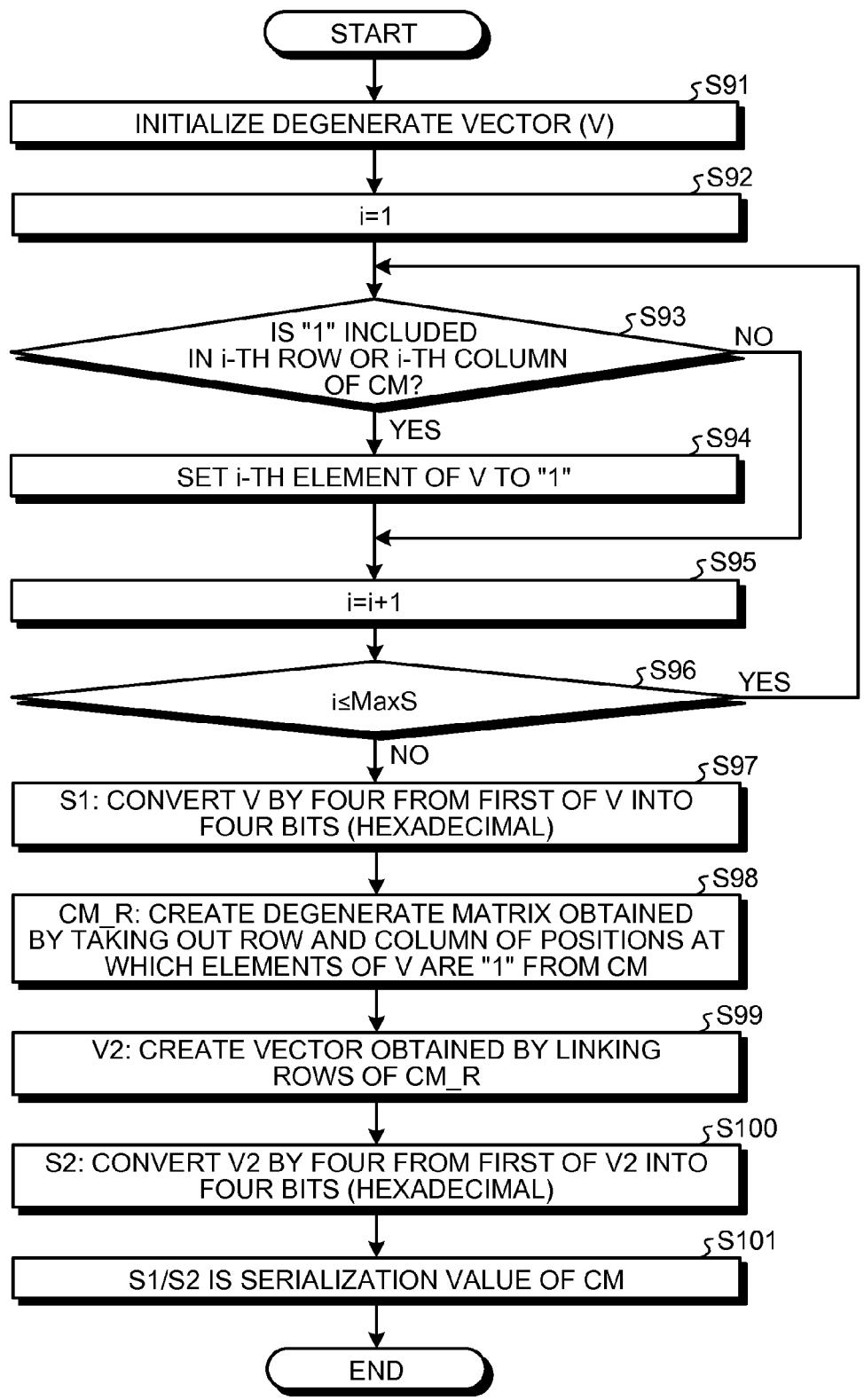
FIG. 16 is a flowchart illustrating the processing procedure of a serializing unit according to the first embodiment.

Next, it will be explained about the processing procedure of S16 illustrated in FIG. 10 with reference to FIG. 16. FIG. 16 is a flowchart illustrating the processing procedure of the serializing unit 150 according to the first embodiment.

First, when the feature element matrix (CM) is output to the serializing unit 150 by the feature element matrix adding unit 140, the serializing unit 150 initializes a degenerate vector (V) (S91). Specifically, because the feature element matrix (CM) is a square matrix of the number of rows MaxS and the number of columns MaxS, the serializing unit 150 sets zero to all bits of the degenerate vectors (V) that consists of, for example, MaxS bits.

Moreover, the serializing unit 150 sets one to the index "i" (S92).

Next, the serializing unit 150 determines whether the specific value "1" is included in the i-th row or the i-th column of the feature element matrix (CM) (S93).

Then, when it is determined that the specific value "1" is included in the i-th row or the i-th column of the feature element matrix (CM) (S93: Yes), the serializing unit 150 sets the i-th element of the degenerate vector (V) to "1" (S94).

After setting the i-th element of the degenerate vector (V) to "1" or when it is determined that the specific value "1" is not included in the i-th row and the i-th column of the feature element matrix (CM) (S93: No), the serializing unit 150 adds +1 to the index "i" (S95).

After that, the serializing unit 150 determines whether the index "i" is not more than the maximum value MaxS of the number of rows and the number of columns (S96).

Then, when it is determined that the index "i" is not more than the MaxS (S96: Yes), the serializing unit 150 moves the process control to S93 to determine whether the specific value "1" is included in the next i-th row or i-th column.

On the other hand, when it is determined that the index "i" is large than the MaxS (S96: No), the serializing unit 150 converts the degenerate vector (V) into a hexadecimal number by four elements from the starting position of the degenerate vector (V) to serialize the degenerate vector (V) and computes a serialized result (S1) (S97).

Continuously, the serializing unit 150 takes out the row and column of each position at which the element of the degenerate vector (V) is "1" from the feature element matrix (CM) and creates a degenerate matrix (CM_R) (S98).

Then, the serializing unit 150 creates a vector (V2) that is obtained by linking the rows of the created degenerate matrix (CM_R) (S99).

Then, the serializing unit 150 converts the created vector (V2) into a hexadecimal number by four elements from the starting position of the created vector (V2) to serialize the degenerate matrix (CM_R) and computes a serialized result (S2) (S100).

Then, the serializing unit 150 acquires a serialization value (S1/S2) of the feature element matrix (CM) from the result (S1) obtained by serializing the degenerate vector (V) and the result (S2) obtained by serializing the degenerate matrix (CM_R) and returns the acquired serialization value to the feature element matrix adding unit 140 (S101).

As above, according to the first embodiment of the present invention, the document checking apparatus 1 extracts keywords and the appearance positions of the key words from a check target text including a confidential document that is a comparison target when similarity between the documents is determined. Then, the document checking apparatus 1 determines, by using a keyword for each appearance position of the extracted keyword as a determination target, whether another extracted keyword is within the range of the associated predetermined number of characters before and after the determination target keyword. Furthermore, the document checking apparatus 1 generates, when it is determined that there is the other keyword, a pair of keywords that is obtained by combining the determination target keyword and the other keyword in association with the anteroposterior information of the appearance positions of the keywords. Then, the document checking apparatus 1 compares the generated plurality of pairs of keywords of the check target text and the plurality of pairs of keywords of the confidential document, determines whether the number of pairs of keywords, among the plurality of pairs of keywords of the check target text, identical to the number of pairs of keywords of the confidential document is not less than the number of similarity determinations, and determines similarity between the check target text and the confidential document on the basis of the determination result.

According to this configuration, because the pairs of keywords of the copied part are common even if the check target text is, for example, a text that is obtained by partially copying the confidential document or a text that is obtained by partially modifying the confidential document, the document checking apparatus 1 can determine similarity between the documents by using the common pairs of keywords within the range of the predetermined number of characters and can determine similarity between the check target text and the confidential document with high accuracy.

Moreover, because many pairs of keywords are common even when the appearance position of keyword is changed even if the check target text is, for example, a text that is obtained by modifying the Japanese particles (TE, NI, WO, and WA) of the sentence of the confidential document, by deleting some keywords, or changing and editing the sentence structure, the document checking apparatus 1 can determine similarity between the documents by using the common pairs of keywords within the range of the predetermined number of characters and can determine similarity between the check target text and the confidential document with high accuracy.

As a result, when the check target text is, for example, a transmission document such as mail, the document checking apparatus 1 can prevent the leak of confidential information if the apparatus refuses to transmit the transmission document to the outside when it is determined that there is similarity between the transmission document and the confidential document.

Moreover, when the check target text is a transmission document to be transmitted to the outside, the document checking apparatus 1 can prevent the mistaken transmission of the transmission document having high confidentiality that is created from the confidential document.

Moreover, because the pairs of keywords of the original confidential document cannot be restored from the information of a feature element matrix when the feature element matrix is configured in such a manner that the plurality of keywords has the same hash value, contents such as private information included in the original confidential document do not leak out even if it is assumed that the contents of the feature element matrix DB 240 leak out to the outside.

The first embodiment has been explained on the assumption that matrix elements corresponding to the pairs of keywords in the feature element matrices of the check target text and the confidential document are set to the specific value "1" and there is the possibility of similarity between the documents if the number of the same matrix elements that means elements together having the specific value "1" in the two feature element matrices is not less than a predetermined value by using the similarity check 1. However, the present invention is not limited to this. It may be assumed that matrix elements corresponding to the pairs of keywords in the feature element matrices of the check target text and the confidential document are set to the number of character strings between the paired keywords and there is the possibility of similarity between the documents if the number of the same matrix elements that means elements together having the same value in the two feature element matrices is not less than the predetermined value by using the similarity check 1. As a result, because the copy is partially performed often times from the confidential document to the check target text without modifying the number of character strings between keywords when cannibalizing the confidential document, the document checking apparatus 1 can detect a possibility with which common pairs of keywords are included in common sentences with high probability and can further determine similarity between the documents with high accuracy by using the similarity check 1.

Moreover, it may be assumed that matrix elements corresponding to the pairs of keywords in the feature element matrices of the check target text and the confidential document are set to the number of appearances of the pairs of keywords and there is the possibility of similarity between the documents if the sum of the values of the matrix elements of the check target text is not less than a predetermined value for one or more matrix elements that have the same matrix element in the two feature element matrices by using the similarity check 1. As a result, because a partial content is copied or revised from the confidential document to the check target text many times when cannibalizing the confidential document, the document checking apparatus 1 can detect a possibility with which a document is edited by using the common pairs of keywords with high probability and can further determine similarity between the documents with high accuracy by using the similarity check 1.

[b] Second Embodiment

However, the document checking apparatus 1 according to the first embodiment determines whether the number of pairs of hash values that are common to a check target text and a confidential document is not less than a predetermined value to determine similarity between both the documents (similarity check 1). Furthermore, when it is determined that there is the possibility of similarity by using "similarity check 1", the document checking apparatus 1 determines whether the number of three continuous hash values is not less than a predetermined value to determine similarity between both the documents (similarity check 2). However, the document checking apparatus 1 is not limited to this. When it is determined that there is the possibility of similarity by using "similarity check 1", the document checking apparatus 1 may specify a similar part with the confidential document that are in the check target text.

Configuration of Document Checking Apparatus According to Second Embodiment

Figure 17:
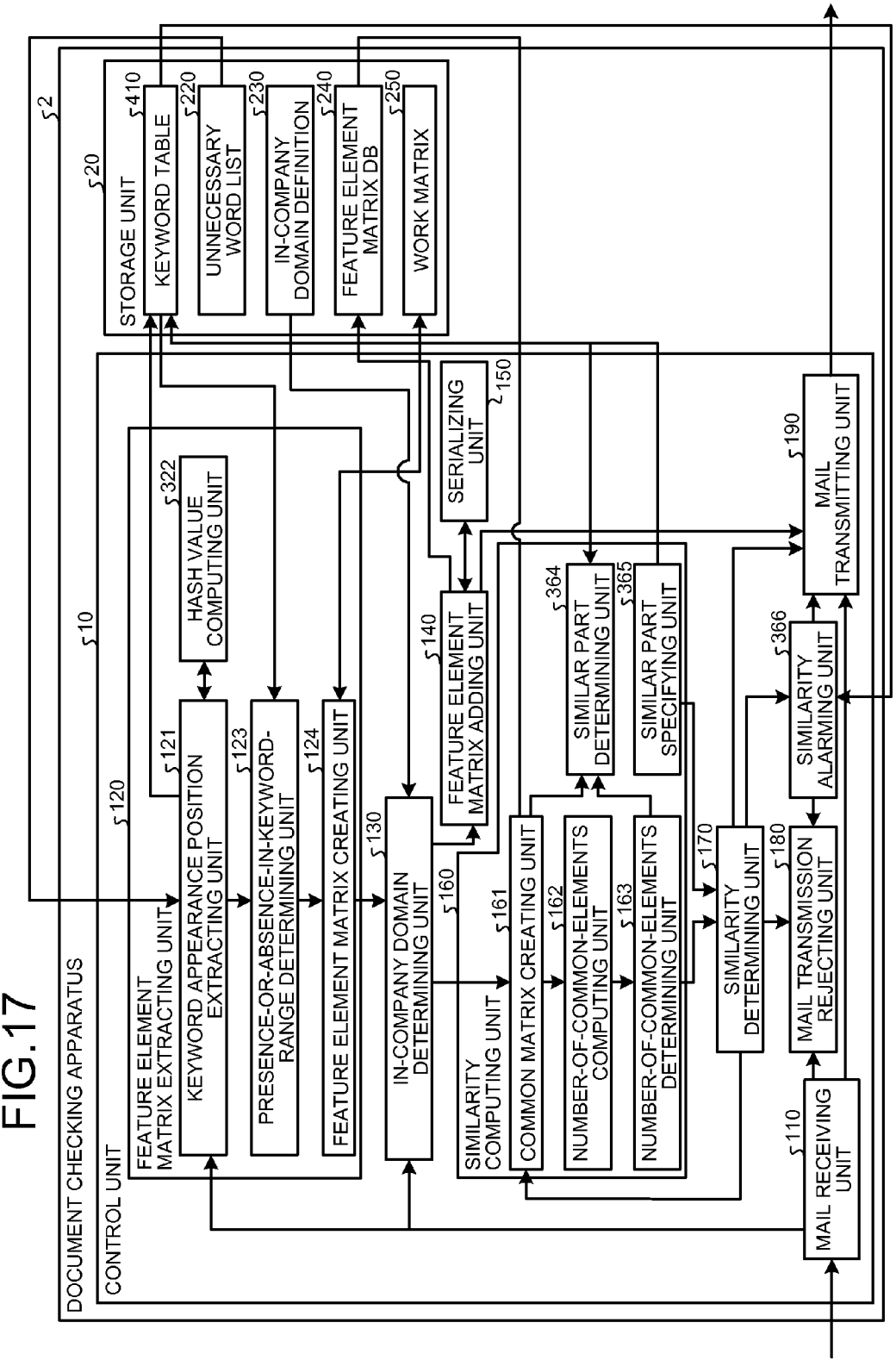
FIG. 17 is a functional block diagram illustrating the configuration of a document checking apparatus according to a second embodiment.

According to the second embodiment, it will be explained about the case where a similar part with a confidential document in a check target text are specified when a document checking apparatus determines that there is the possibility of similarity by using "similarity check 1". FIG. 17 is a functional block diagram indicating the configuration of a document checking apparatus 2 according to the second embodiment. In FIG. 17, the same components as those of the document checking apparatus 1 illustrated in FIG. 2 have the same reference numbers and thus the descriptions for the overlapping configuration and operation are omitted. A difference between the first embodiment and the second embodiment is in that a similar part determining unit 364 and a similar part specifying unit 365 are added instead of the number-of-three-continuous-hash-values computing unit 164 and the number-of-three-continuous-hash-values determining unit 165 included in the similarity computing unit 160. A further difference between the first embodiment and the second embodiment is in that the hash value computing unit 122 is changed to a hash value computing unit 322 and the keyword table 210 is changed to a keyword table 410 by modifying the configuration content thereof.

It will be explained about an example of the data structure of the keyword table 410 with reference to FIG. 18. FIG. 18 is a diagram illustrating an example of the data structure of the keyword table 410 according to the second embodiment. As illustrated in FIG. 18, the keyword table 410 stores a word position 410*a*, a keyword 410*b*, a hash value 410*d*, and a similarity degree 410*e* in association with each appearance position 410*c*. The numeric values of the word position 410*a* are values that are obtained by assigning consecutive numbers to the keywords of the keyword 410*b* that appear inside the check target text from the most front of the appearance position 410*c* of the keyword 410*b*. For example, the word positions "A", "B", and "C" of the keyword 410*b* are respectively assigned to "1", "2", and "22" from the most front of the appearance position 410*c*.

The similarity degree 410*e* indicates whether a corresponding keyword is included in a similar part similar to the confidential document inside the check target text. For example, when the corresponding keyword is included in a similar part with the confidential document inside the check target text, the similarity degree 410*e* is set to "1" indicating a similar part. On the other hand, when the corresponding keyword is not included in the similar part with the confidential document inside the check target text, the similarity degree 410*e* is set to "0" indicating a dissimilar part.

When acquiring a keyword from the keyword appearance position extracting unit 121, the hash value computing unit 322 computes a hash value from the acquired keyword and outputs the computed hash value to the keyword appearance position extracting unit 121. Specifically, the hash value computing unit 322 multiplies the character code of the first character of the keyword by the character code of the last character among the character codes of all characters constituting the keyword. Then, the hash value computing unit 322 adds the character codes of remaining characters except for the first and last to the multiplied value. Furthermore, the hash value computing unit 322 divides the added value by the maximum number of the hash values and uses a value obtained by adding one to the residual value of the division result as the hash value of the keyword acquired from the keyword appearance position extracting unit 121.

When it is determined by the number-of-common-elements determining unit 163 that the number of common elements is not less than a predetermined value, the similar part determining unit 364 determines whether the appearance density of the keywords included in the pairs of keywords (a pair of hash values) inside the check target text is higher than a reference value. Specifically, when acquiring a common matrix from the common matrix creating unit 161, the similar part determining unit 364 extracts pairs of keywords (pairs of hash values) from the acquired common matrix. Moreover, the similar part determining unit 364 extracts the word positions 410*a* of keywords corresponding to all the extracted pairs of keywords (pairs of hash values) from the keyword table 410 and temporarily saves the word positions in a memory area (not illustrated).

For example, it is assumed that a matrix element (5, 14) indicating a pair of hash values is set to the specific value "1" in the common matrix. The similar part determining unit 364 extracts the matrix element (5, 14) having the specific value "1" from the common matrix. In other words, the similar part determining unit 364 extracts a pair of hash values that consists of the hash values "5" and "14". Then, the similar part determining unit 364 searches the word positions 410a, at which the appearance positions 410c of the keywords corresponding to the two hash values "5" and "14" are within the range of the predetermined number of characters (for example, 100), from the keyword table 410. In this case, it is assumed that the appearance positions 410c of the keywords corresponding to the hash values "5" and "14" respectively are "135" and "163". Because the appearance positions 410c of the keywords are within the range of the number of characters of "100", the similar part determining unit 364 acquires the word positions 410a "22" and "24" as a search result. Then, the similar part determining unit 364 saves "22" and "24" that are the searched word positions 410a in the memory area.

The similar part determining unit 364 treats the predetermined number of consecutive keywords included in the check target text as a determination part and determines whether the number of keywords included in the pairs of keywords (pairs of hash values) in the determination part is not less than a reference value. Specifically, the similar part determining unit 364 treats the predetermined number of consecutive word positions 410a stored in the keyword table 410 as a determination part. Then, the similar part determining unit 364 determines whether word positions identical to the word positions saved in the memory area are not less than a reference value in the determination part. In other words, the similar part determining unit 364 determines whether word positions corresponding to the pairs of keywords (pairs of hash values) are not less than the reference value in the determination part.

When the determination part is specified as a similar part by the similar part specifying unit 365 to be described below, the similar part determining unit 364 obtains a word position that is located more backward than the final word position 410a of the specified similar part and that is the position of the initial keyword included in the pairs of keywords. Then, the similar part determining unit 364 treats as the next determination part the predetermined number of consecutive word positions up to the obtained word position. Then, the similar part determining unit 364 determines whether a word position identical to the word position saved in the memory area is not less than the reference value in the determination part.

On the other hand, when the determination part is not specified as a similar part by the similar part specifying unit 365, the similar part determining unit 364 obtains the word position of a keyword that is located backward by one. Then, the similar part determining unit 364 treats as the next determination part the predetermined number of consecutive word positions up to the obtained word position. Then, the similar part determining unit 364 determines whether a word position identical to the word position saved in the memory area is not less than the reference value in the determination part. Furthermore, even if the determination part is specified as a similar part by the similar part specifying unit 365, the similar part determining unit 364 may treat the predetermined number of word positions up to the word position of a keyword that is located backward by one as the next determination part.

When it is determined by the similar part determining unit 364 that the appearance density of the keywords included in the pairs of keywords (pairs of hash values) inside the check target text is higher than a reference value, the similar part specifying unit 365 specifies a part having the high appearance density as a similar part. Specifically, when the number of word positions of the pairs of keywords (pairs of hash values) saved in the memory area inside the predetermined number of consecutive word positions 410a (determination part) stored in the keyword table 410 is not less than the reference value, the similar part specifying unit 365 specifies the determination part. The specified determination part becomes a similar part (hereinafter, "similar block") similar to the confidential document inside the check target text. Then, the similar part specifying unit 365 stores "1" in the similarity degree 410e of the keyword table 410 corresponding to the word position included in the similar block. Furthermore, the similar part specifying unit 365 informs the similarity determining unit 170 of a document similarity message of the effect that the check target text and the confidential document are similar to each other.

On the other hand, when the number of word positions of the pairs of keywords saved in the memory area inside the determination part is less than the reference value, the similar part specifying unit 365 treats the determination part as "dissimilar block". Then, the similar part specifying unit 365 informs the similarity determining unit 170 of a document dissimilarity message of the effect that there is not the possibility of similarity between the check target text and the confidential document.

Figure 19:
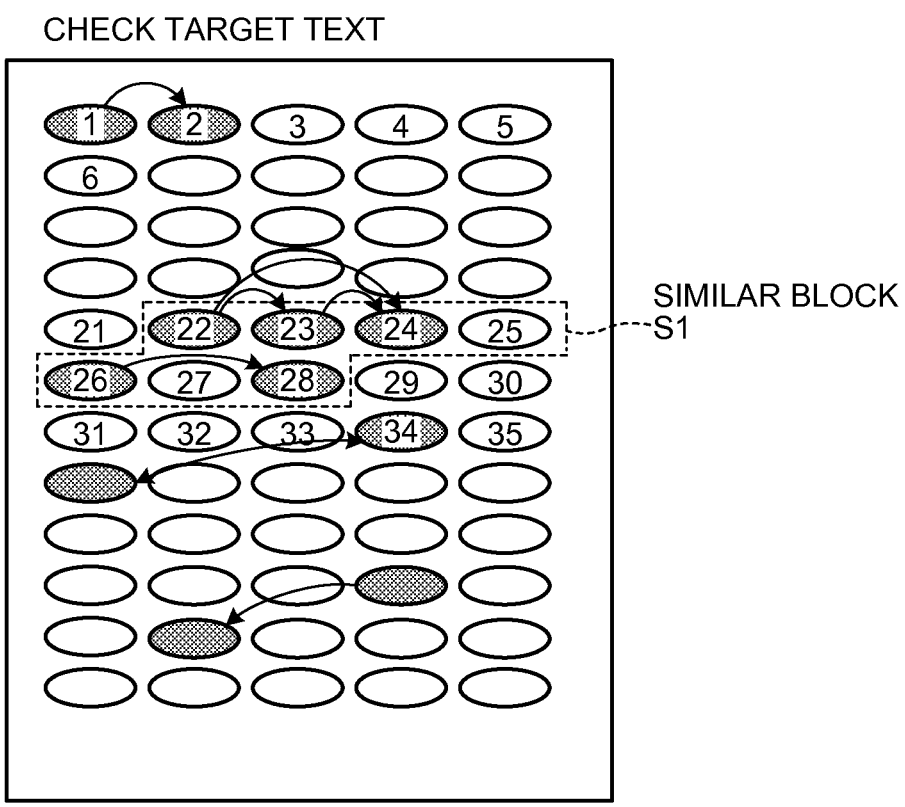
FIG. 19 is a diagram illustrating an example of a similar part specifying method according to the second embodiment.

Now, it will be explained about a similar part specifying method with reference to FIG. 19. FIG. 19 is a diagram illustrating an example of a similar part specifying method according to the second embodiment. As illustrated in FIG. 19, keywords inside the check target text are illustrated and the word positions of the keywords are illustrated in ascending order. In this case, a black keyword indicates one keyword of the pair of keywords (pair of hash values) extracted from the common matrix. Moreover, two keywords indicated with an arrow mean a pair of keywords (pair of hash values).

First, the similar part determining unit 364 determines whether the number of keywords included in the pairs of keywords (pairs of hash values) is not less than a reference value in the predetermined number of consecutive keywords (determination part) from the word position "1" inside the check target text. For convenience of explanation, in FIG. 19, it is assumed that the predetermined number is "5" and the reference value is "3". Because the number of keywords included in the pairs of keywords is only two in the consecutive keywords from the word position "1" to the word position "5" inside the check target text, the similar part determining unit 364 determines that this number is less than "3". Then, the similar part specifying unit 365 treats the word positions of "1" to "5" as a dissimilar block.

Moreover, the similar part determining unit 364 determines whether the number of keywords included in the pairs of keywords (pairs of hash values) is not less than "3" in the five consecutive keywords from the word position "2" inside the check target text. However, because the number of keywords included in the pairs of keywords is only one in the consecutive keywords from the word position "2" to the word position "6" inside the check target text, the similar part determining unit 364 determines that this number is less than "3". Then, the similar part specifying unit 365 treats the word positions of "2" to "6" as a dissimilar block.

Moreover, the similar part determining unit 364 sequentially moves backward the forehand word position in the determination area indicating five consecutive word positions, treats the word positions of five consecutive keywords from the newly forehand word position as the next determination area, and repeats a determination operation. Then, the similar part determining unit 364 determines, for example, whether the number of keywords included in the pairs of keywords (pairs of hash values) is not less than "3" in the five consecutive keywords from the word position "22" inside the check target text. As a result, because the number of keywords included in the pairs of keywords is four of "22", "23", "24", and "26" in the consecutive keywords from the word position "22" to the word position "26" inside the check target text, the similar part determining unit 364 determines that this number is not less than "three". Then, the similar part specifying unit 365 specifies the word positions of "22" to "26" as a similar block.

Moreover, because the similar block is specified by the similar part specifying unit 365, the similar part determining unit 364 obtains the word position of a keyword included in the initial pair of keywords that is located more backward than the final word position "26" of the similar block. At this time, the similar part determining unit 364 acquires a word position "28". Then, the similar part determining unit 364 determines whether five keywords are a similar block with regard to the five consecutive keywords up to the acquired word position "28". In other words, the similar part determining unit 364 determines whether the number of keywords included in the pairs of keywords (pairs of hash values) is not less than "three" in the five consecutive keywords from the word position "24" inside the check target text. As a result, because the number of keywords included in the pairs of keywords is three of "24", "26", and "28" in the consecutive keywords from the word position "24" to the word position "28" inside the check target text, the similar part determining unit 364 determines that this number is not less than "three". Then, the similar part specifying unit 365 specifies the word positions of "24" to "28" as a similar block. As a result, the similar part specifying unit 365 combines the previously specified "22" to "26" as a similar block and specifies the word positions of "22" to "28" as a consecutive similar block S1.

Moreover, because the similar block is specified by the similar part specifying unit 365, the similar part determining unit 364 obtains a word position that is the position of a keyword located more backward than the final word position "28" of the similar block and that is the position of the initial keyword included in the pairs of keywords. In this case, the similar part determining unit 364 acquires a word position "34". Then, the similar part determining unit 364 determines whether five keywords are a similar block with regard to the five consecutive keywords up to the acquired word position "34". In other words, the similar part determining unit 364 determines whether the number of keywords included in the pairs of keywords (pairs of hash values) is not less than "three" in the five consecutive keywords from a word position "30" inside the check target text. However, because the number of keywords included in the pairs of keywords is only one in the consecutive keywords from the word position "30" to the word position "34" inside the check target text, the similar part determining unit 364 determines that this number is less than "three". Then, the similar part specifying unit 365 treats the word positions "30" to "34" as a dissimilar block.

As a result, the similar part specifying unit 365 specifies the word positions of "22" to "28" as a similar block. In this way, the similar part specifying unit 365 specifies a similar part similar to a confidential document inside a check target text by using the similar part specifying method.

Returning to FIG. 17, when acquiring various types of notifications from the number-of-common-elements determining unit 163 and the similar part specifying unit 365, the similarity determining unit 170 sequentially determines whether the check target text and the confidential document are similar to each other for each confidential document in accordance with the acquired notifications.

Specifically, when acquiring the document dissimilarity message, the similarity determining unit 170 informs the common matrix creating unit 161 of the effect that the next confidential document is selected when there is a confidential document for which similarity determination with the check target text is not performed. Moreover, when acquiring the document similarity message, the similarity determining unit 170 informs the mail transmitting unit 190 of a mail transmission request when there is not a confidential document for which similarity determination with the check target text is not performed. On the other hand, when acquiring the document similarity message from the similar part specifying unit 365, the similarity determining unit 170 informs a similarity alarming unit 366 of a mail similarity confirmation request.

When acquiring the mail similarity confirmation request from the similarity determining unit 170, the similarity alarming unit 366 makes, for example, a monitor connected to the document checking apparatus 2 display an alarm screen that is made by editing the similar block inside the check target text. Specifically, the similarity alarming unit 366 edits an alarm screen including the range of the appearance position 410c of the keyword inside the check target text, in which "1" is stored in the similarity degree 410e of the keyword of the keyword table 410. Then, the similarity alarming unit 366 makes the monitor display the edited alarm screen. In other words, when a client is, for example, going to transmit a document including a confidential document to an out-company destination that is not an in-company domain with fault or by intent, the similarity alarming unit 366 displays a similar part and the like similar to the confidential document on the alarm screen and presses the client that is transmitting a mail for the confirmation of the transmission mail. Then, the similarity alarming unit 366 informs the mail transmitting unit 190 of the mail transmission request when the transmission of the transmission mail is permitted. On the other hand, the similarity alarming unit 366 informs the mail transmission rejecting unit 180 of the transmission rejection request for the mail when the transmission of the transmission mail is rejected.

Figure 20:
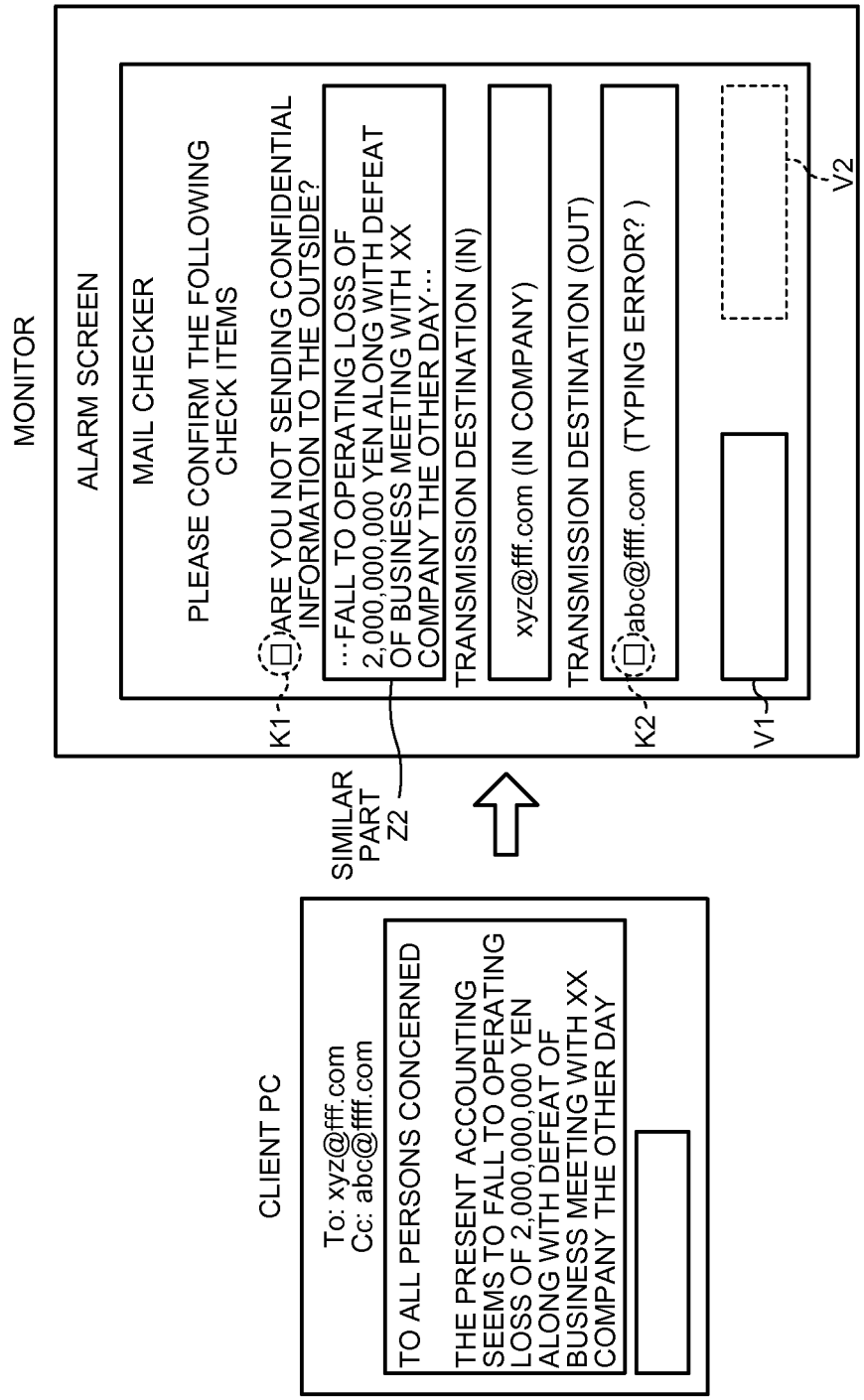
FIG. 20 is a diagram illustrating an example of an alarm screen.

Now, it will be explained about an alarm screen displayed by the similarity alarming unit 366 with reference to FIG. 20. FIG. 20 is a diagram illustrating an example of an alarm screen. As illustrated in FIG. 20, a similar part Z2 similar to the confidential document in the mail (check target text) transmitted from a client PC is displayed on the alarm screen. Moreover, in-system and out-system mail addresses among the transmission destinations of the mail transmitted from the client PC are displayed on the alarm screen.

Specifically, the similarity alarming unit 366 displays the similar part Z2 in the transmission mail and the out-system transmission destination and displays check boxes (K1 and K2) respectively corresponding to these. At this time, the similarity alarming unit 366 hides a transmission button V2 that activates a mail transmission request so that the transmission request cannot be activated.

When the check box K1 of the similar part and the check box K2 of the out-system transmission destination are checked, the similarity alarming unit 366 displays the transmission button V2. Then, in response to the button operation of the transmission button V2, the similarity alarming unit 366 informs the mail transmitting unit 190 of the mail transmission request in accordance with the transmission permission for the transmission mail. On the other hand, in response to the button operation of a transmission rejection button V1, the similarity alarming unit 366 informs the mail transmission rejecting unit 180 of the transmission rejection request for the mail in accordance with the transmission rejection of the transmission mail.

Returning to FIG. 17, when acquiring the transmission rejection request for the mail from the similarity determining unit 170 or the similarity alarming unit 366, the mail transmission rejecting unit 180 blocks the transmission of the mail acquired from the mail receiving unit 110. When acquiring the mail transmission request from the feature element matrix adding unit 140, the similarity determining unit 170, or the similarity alarming unit 366, the mail transmitting unit 190 transmits the mail acquired from the mail receiving unit 110 to the transmission destination of the mail.

Algorithm of Similar Part Specifying Method According to Second Embodiment

Figure 21:
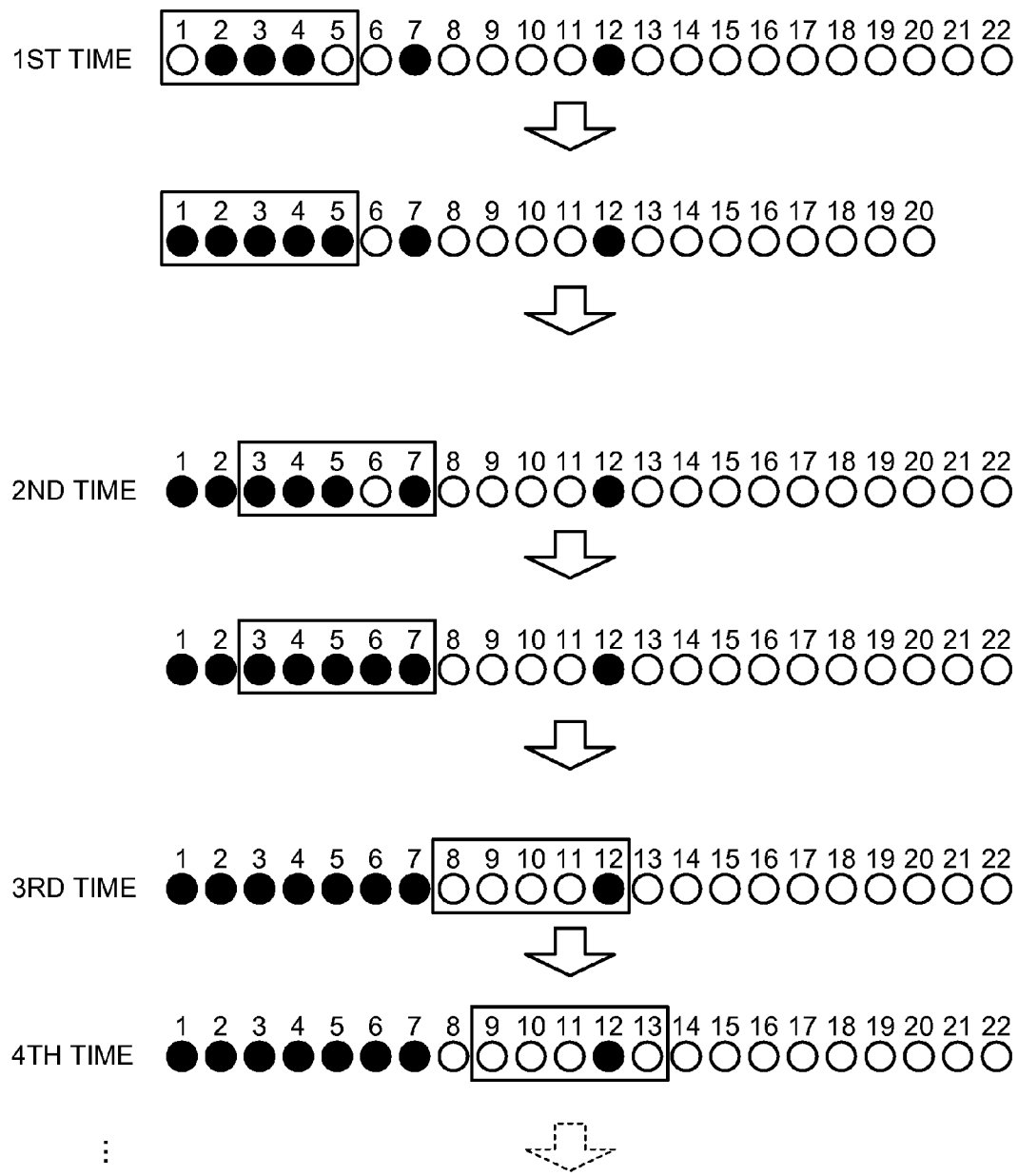
FIG. 21 is a diagram explaining an algorithm of the similar part specifying method according to the second embodiment.

Now, it will be explained about an algorithm of a similar part specifying method according to the second embodiment with reference to FIG. 21. FIG. 21 is a diagram explaining an algorithm of a similar part specifying method according to the second embodiment. As illustrated in FIG. 21, keywords inside the check target text are represented and the word positions of these keywords are represented in ascending order. White circles or black circles are keywords and a number on a circle indicates a word position. Moreover, a black circle indicates one keyword ("similar word") of a pair of keywords (a pair of hash values).

At the first time, the similar part determining unit 364 treats the predetermined number of consecutive keywords included in the check target text as a determination part and determines whether the number of "similar words" in the determination part is not less than a reference value. In other words, the similar part determining unit 364 determines whether the number of common similar words between the check target text and the confidential document is not less than the reference value in the determination part. Then, when it is determined that the number of common similar words is not less than the reference value in the determination part, the similar part determining unit 364 determines that the appearance density of the similar words in the determination part inside the check target text is high.

It is assumed that the predetermined number is "5" and the reference value is "3". It is assumed that the determination part is the word positions of five consecutive keywords. The similar part determining unit 364 sequentially performs a determination process by backward moving a determination part by using the determination part as a unit.

First, the similar part determining unit 364 treats consecutive keywords from the word position "1" to the word position "5" inside the check target text as a determination part and determines whether the number of "similar words" is not less than "three" in the determination part. In the example of FIG. 21, the number of similar words is "three" (keywords of the word positions of "2" to "4") in the determination part. Therefore, when it is determined that the number of the corresponding keywords is not less than "three", the similar part determining unit 364 determines that an appearance density in the determination part from the word position "1" to "5" is high. Then, the similar part specifying unit 365 specifies the determination part from the word position "1" to "5" as a similar block.

Next, at the second time, when the current determination part is a similar block, the similar part determining unit 364 moves a determination part to an initial "similar word" located more backward than the rightmost word position of the current determination part. In the example of FIG. 21, because the word position of the initial "similar word" located more backward than the rightmost word position "5" of the current determination part is "7", the similar part determining unit 364 treats five word positions from the word position "3" to "7" as a determination part. Then, the similar part determining unit 364 determines whether the number of "similar words" is not less than "three" in the determination part. In the example of FIG. 21, the number of similar words is "three" (keywords of the word positions "3", "4", and "7") in the determination part. Therefore, when it is determined that the number of the corresponding keywords is not less than "three", the similar part determining unit 364 determines that an appearance density in the determination part from the word position "3" to "7" is high. Then, the similar part specifying unit 365 specifies the determination part from the word position "3" to "7" as a similar block.

Next, at the third time, when the current determination part is a similar block, the similar part determining unit 364 moves a determination part to an initial "similar word" located more backward than the rightmost word position of the current determination part. In the example of FIG. 21, because the word position of the initial "similar word" located more backward than the rightmost word position "7" of the current determination part is "12", the similar part determining unit 364 treats five word positions from the word position "8" to "12" as a determination part. Then, the similar part determining unit 364 determines whether the number of "similar words" is not less than "three" in the determination part. In the example of FIG. 21, the number of similar words is "one" (the word position 12) in the determination part. Therefore, when it is determined that the number of the corresponding keywords is less than "three", the similar part determining unit 364 determines that an appearance density in the determination part from the word position "8" to "12" is not high. Then, the similar part specifying unit 365 treats the determination part from the word position "8" to "12" as a dissimilar block.

Next, at the fourth time, when the current determination part is a dissimilar block, the similar part determining unit 364 moves the right edge of the current determination part to the right by only one. In the example of FIG. 21, when the rightmost word position "12" of the current determination part is moved to the right by only one, the similar part determining unit 364 treats five word positions from the word position "9" to "13" as a determination part. Then, the similar part determining unit 364 determines whether the number of "similar words" is not less than "three" in the determination part. In the example of FIG. 21, the number of similar words is "one" (the word position 12) in the determination part. Therefore, when it is determined that the number of the corresponding keywords is less than "three", the similar part determining unit 364 determines that an appearance density in the determination part from the word position "9" to "13" is not high. Then, the similar part specifying unit 365 treats the determination part from the word position "9" to "13" as a dissimilar block.

Similarly, the similar part determining unit 364 and the similar part specifying unit 365 repeat the similar part specifying method and specify similar blocks in the check target text until the right edge of the determination part exceeds the final word position of the check target text. In this way, similar blocks similar to the confidential document inside the check target text are specified by using the algorithm.

Document Checking Process of Document Checking Apparatus According to Second Embodiment Next, it will be explained about a document checking process of the document checking apparatus 2 according to the second embodiment. Among the procedures of the document checking process of the document checking apparatus 2 according to the second embodiment, the same processing procedures as those (FIG. 10 to FIG. 16) of the document checking apparatus 1 according to the first embodiment have the same reference numbers, and thus their overlapping descriptions are omitted.

Figure 22:
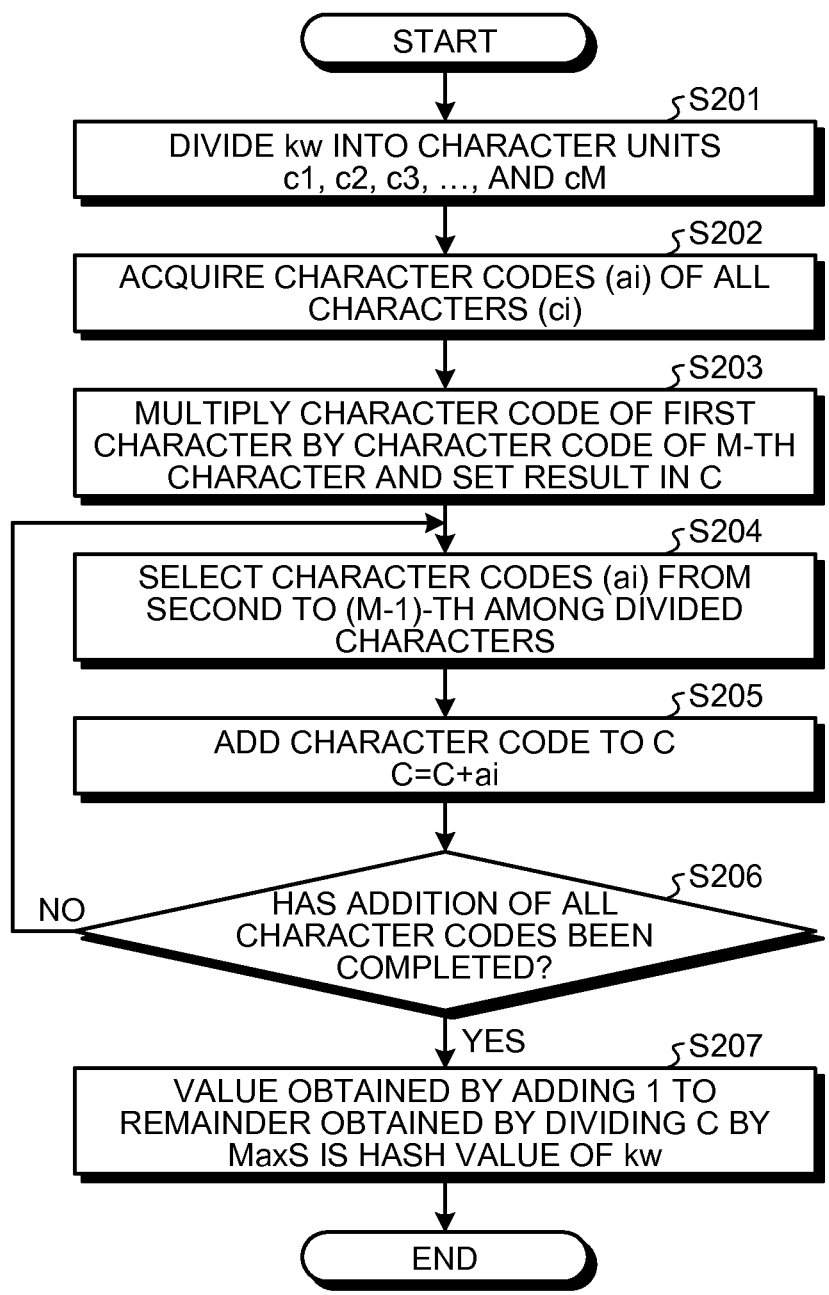
FIG. 22 is a flowchart illustrating the processing procedure of a hash value computing unit according to the second embodiment.

Now, it will be explained about the processing procedure of S45 for computing the hash value of keyword illustrated in FIG. 12 with reference to FIG. 22. FIG. 22 is a flowchart illustrating the processing procedures of the hash value computing unit 322 according to the second embodiment. First, the hash value computing unit 322 divides the keyword (kw) extracted by the keyword appearance position extracting unit 121 into character units (for example, c1, c2, c3, . . . , and cM) (S201).

Then, the hash value computing unit 322 acquires the character codes (ai) of all the divided characters (ci) (S202).

Next, the hash value computing unit 322 multiplies the character code of the first (start) character (c1) of the keyword by the character code of the M-th (last) character (cM) of the keyword and sets the multiplication value in the count (C) (S203).

Next, the hash value computing unit 322 sequentially selects the character codes (ai) from the second character (c2) to the (M−1)-th character (cM) among the divided characters (S204).

Continuously, the hash value computing unit 322 adds the character code (ai) of the selected character (ci) to a value set in the count (C) and sets the addition result in the count (C) (S205).

After that, the hash value computing unit 322 determines whether the addition of the character codes (ai (i=2 to M−1)) for all the divided characters has been completed (S206). Then, when the addition of the character codes for all characters has not been completed (S206: No), the hash value computing unit 322 moves the process control to S204 to select the next character.

On the other hand, when the addition of the character codes for all characters has been completed (S206: Yes), the hash value computing unit 322 divides the value set in the count (C) by the maximum number (MaxS) of the hash value and computes a value obtained by adding +1 to the residual value of the division result (S207). As a result, the computed value becomes the hash value of the keyword (kw). The hash value computing unit 322 then returns the computed hash value to the keyword appearance position extracting unit 121.

Figure 23:
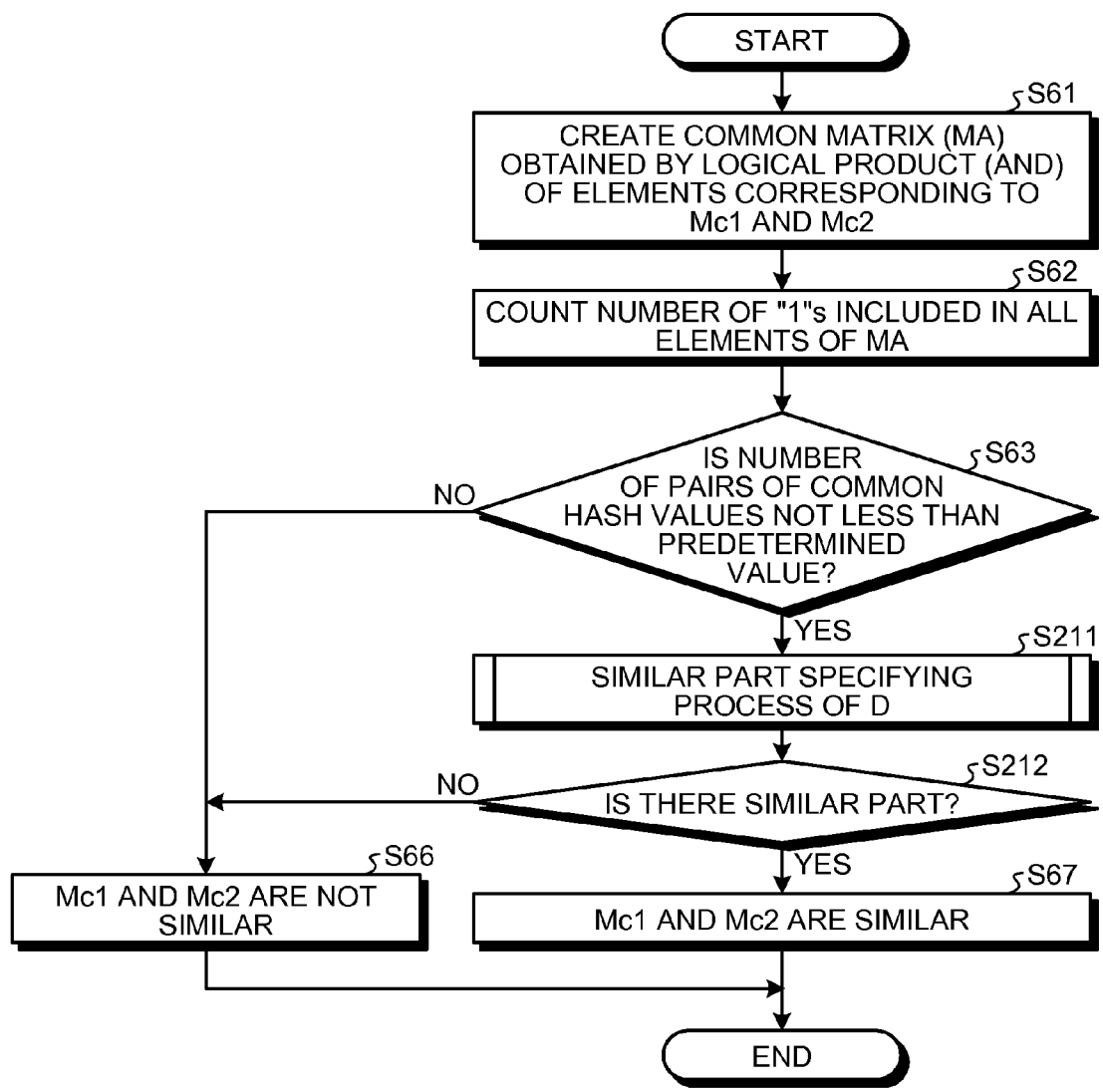
FIG. 23 is a flowchart illustrating the processing procedure of a similarity computing unit according to the second embodiment.

Next, it will be explained about the processing procedure of S20 for computing a similarity between the feature element matrix of the check target text (D) and the feature element matrix of the confidential document illustrated in FIG. 10 with reference to FIG. 23. FIG. 23 is a flowchart illustrating the processing procedures of the similarity computing unit 160 according to the second embodiment. In FIG. 23, the same processing procedures as those (FIG. 14) of the similarity computing unit 160 according to the first embodiment have the same reference numbers, and thus the overlapping descriptions are omitted.

First, the common matrix creating unit 161 computes a logical product of the feature element matrix (Mc1) of the check target text (D) acquired from the in-company domain determining unit 130 and the generated feature element matrix (Mc2) of the confidential document and creates the common matrix (MA) (S61). Then, the common matrix creating unit 161 outputs the created common matrix (MA) to the number-of-common-elements computing unit 162.

Next, the number-of-common-elements computing unit 162 counts the number of the specific values "1" (the number of common elements) that are common elements included in each matrix element of the acquired common matrix (MA) (S62). As a result, because the number of common elements is the number of pairs of keywords common to the check target text (D) and the confidential document, it is expected that the number of pairs of hash values common to the check target text (D) and the confidential document is decided.

Then, the number-of-common-elements determining unit 163 determines whether the number of pairs of hash values common to the check target text (D) and the confidential document is not less than a predetermined value (S63). Then, when it is determined that the number of hash values is not less than the predetermined value (S63: Yes), the number-of-common-elements determining unit 163 determines that there is the possibility of similarity between the confidential document and the check target text and informs the similar part determining unit 364 of the effect that there is the possibility of similarity between the documents. On the other hand, when it is determined that the number of hash values is less than the predetermined value (S63: No), the number-of-common-elements determining unit 163 determines that there is not the possibility of similarity between the check target text (D) and the confidential document and informs the similarity determining unit 170 of the effect that there is not the possibility of similarity between the documents (S66).

Next, when receiving the effect that there is the possibility of similarity between the documents from the number-of-common-elements determining unit 163, the similar part determining unit 364 treats the predetermined number of consecutive keywords included in the check target text (D) as a determination part. Then, the similar part determining unit 364 determines whether the number of keywords included in the pairs of keywords (pairs of hash values) in the determination part is not less than a reference value. Then, when it is determined by the similar part determining unit 364 that the number of keywords included in the pairs of keywords (pairs of hash values) is not less than the reference value, the similar part specifying unit 365 specifies the determination part as a similar part (S211). Such a process is referred to as "a similar part specifying process" to be described below.

Then, the similar part specifying unit 365 determines whether there is a similar part between the check target text (D) and the confidential document (S212). In other words, the similar part specifying unit 365 determines whether the feature element matrix (Mc1) of the check target text (D) and the feature element matrix (Mc2) of the confidential document have similarity. Specifically, the similar part specifying unit 365 determines whether there is a similar part on the basis of whether "1" indicating the similar part is set in the similarity degree 410e of the keyword table 410.

Then, when it is determined that there is a similar part between the check target text (D) and the confidential document, in other words, when it is determined that Mc1 and Mc2 are similar (S212: Yes), the similar part specifying unit 365 informs the similarity determining unit 170 of a document similarity message (S67).

On the other hand, when it is determined that there is not a similar part between the check target text (D) and the confidential document (S212: No), the similar part specifying unit 365 determines that there is not the possibility of similarity between the check target text (D) and the confidential document and informs the similarity determining unit 170 of a document dissimilarity message (S66).

Figure 24:
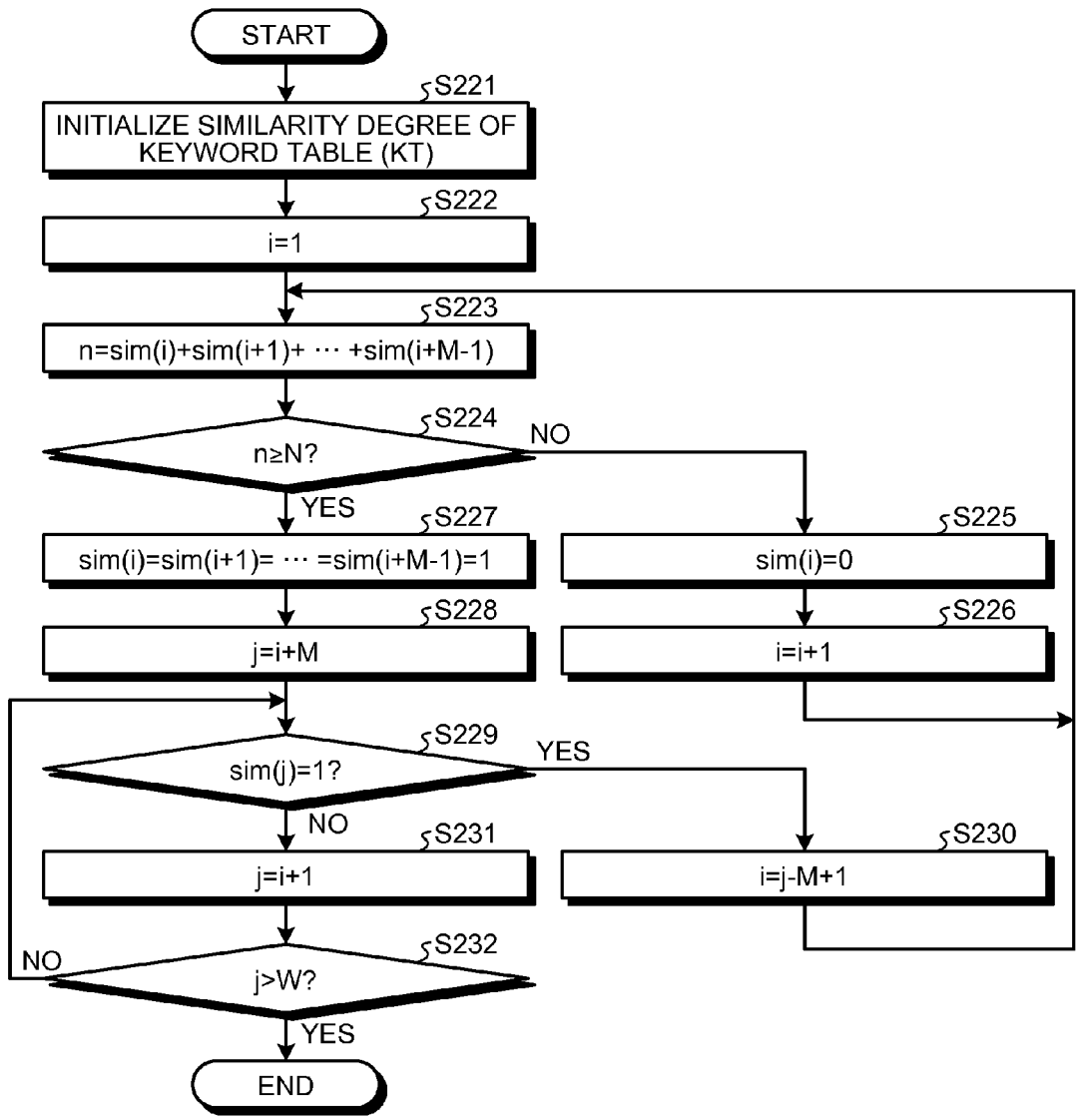
FIG. 24 is a flowchart illustrating the processing procedure of a similar part specifying process according to the second embodiment.

Next, it will be explained about the processing procedure of the similar part specifying process 5211 illustrated in FIG. 23 with reference to FIG. 24. FIG. 24 is a flowchart illustrating the processing procedures of the similar part specifying process according to the second embodiment. In FIG. 24, it is assumed that the total number of the keywords 410b stored in the keyword table (KT) 410 is W words. Moreover, it is assumed that the hash value of the i-th (i is a natural number) word position 410a is indicated by a function hash(i). It is assumed that the similarity degree of the i-th word position 410a is indicated by a function sim(i). Furthermore, it is assumed that the consecutive M word positions inside the check target text (D) is a determination part and a reference value is N.

First, the similar part determining unit 364 initializes the similarity degrees 410e of the keyword table (KT) 410 (S221). Specifically, the similar part determining unit 364 sets the similarity degrees 410e corresponding to all the word positions 410a of the keyword table (KT) 410 to an initial value "zero". Then, the similar part determining unit 364 extracts all pairs of keywords (pairs of hash values) from the common matrix (MA) and extracts the word positions 410a of the keywords corresponding to the extracted pairs of keywords (pairs of hash values) from the keyword table (KT) 410. The similar part determining unit 364 then sets the similarity degrees 410e corresponding to the extracted word positions 410a to "1" indicating a similar part. For example, when the specific value "1" is included in the row or column of the common matrix (MA) that is identical to a hash value h (h=hash(i)) of the i-th word position 410a, the similar part determining unit 364 sets the similarity degree 410e of the i-th word position 410a to "1" (1=sim(i)).

Continuously, the similar part determining unit 364 sets the index "i" indicating a start word position to the minimum value "1" of the word position 410a of the keyword table (KT) 410 (S222). It is assumed that the keyword table (KT) 410 is sorted by the values of the word position 410a in ascending order.

Then, the similar part determining unit 364 obtains the number of keywords included in the pairs of keywords (pairs of hash values) in consecutive M keywords included in the check target text (D). Specifically, the similar part determining unit 364 adds the values of the similarity degrees 410e for the consecutive M word positions 410a from the start word position indicated by the index "i" as in Equation (1) and obtains the number of similarities "n" (S223).

$$n = sim(i) + sim(i+1) + \ldots + sim(i+M-1) \quad (1)$$

Then, the similar part determining unit 364 determines whether the number of similarities "n" is not less than a reference value N (S224). When it is determined by the similar part determining unit 364 that the number of similarities "n" is less than the reference value N (S224: No), the similar part specifying unit 365 sets the similarity degree 410e for the start word position indicated by the index "i" to sim(i) "0" (S225). Then, the similar part determining unit 364 adds 1 to the index "i" indicating the next start word position (S226).

On the other hand, when it is determined by the similar part determining unit 364 that the number of similarities "n" is not less than the reference value N (S224: Yes), the similar part specifying unit 365 specifies the M word positions that are consecutive from the index "i" indicating the start word position as a similar part. Specifically, the similar part specifying unit 365 sets the similarity degrees 410e for the M word positions 410a that are consecutive from "i" indicating the start word position to "1" as in Equation (2) (S227).

$$sim(i) = sim(i+1) = \ldots = sim(i+M-1) = 1 \quad (2)$$

Continuously, the similar part determining unit 364 sets the word position (i+M) in the index "j" to set the index "i" indicating the next start word position (S228). Then, the similar part determining unit 364 determines whether the similarity degree 410e of the j-th word position 410a is "1" as in Equation (3) (S229).

$$sim(j) = 1 \quad (3)$$

Then, when it is determined that the similarity degree 410e of the j-th word position 410a is "1" (S229: Yes), the similar part determining unit 364 sets the index "i" indicating the next start word position to (j−M+1) (S230). The similar part determining unit 364 then moves the process control to S223. In other words, when a similar part is specified, the similar part determining unit 364 obtains the word position (j) of a keyword that is more backward than the final word position (i+M−1) of the similar part and that is an initial keyword that has the similarity degree 410e of "1". Then, the similar part determining unit 364 obtains the next start word position in which the obtained word position (j) becomes the end word position of the consecutive M word positions.

On the other hand, when it is not determined that the similarity degree 410e of the j-th word position 410a is "1" (S229: No), the similar part determining unit 364 adds +1 to the index "j" (S231). Then, the similar part determining unit 364 determines whether the index "j" is larger than the total number of keywords W (S232). When it is determined that the index "j" is not larger than the total number of keywords W (S232: No), the similar part determining unit 364 moves the process control to S229. On the other hand, when it is determined that the index "j" is larger than the total number of keywords W (S232: Yes), the similar part determining unit 364 terminates the similar part specifying process.

Effect of Second Embodiment

As described above, according to the second embodiment, the number-of-common-elements determining unit 163 in the document checking apparatus 2 compares the plurality of pairs of keywords of the check target text and the plurality of pairs of keywords of the confidential document. The number-of-common-elements determining unit 163 then determines whether the number of pairs of keywords, among the plurality of pairs of keywords of the check target text, identical to the pairs of keywords of the confidential document is not less than a predetermined value. When it is determined that the number of pairs of keywords identical to the pairs of keywords of the confidential document is not less than the predetermined value, the similar part determining unit 364 determines whether the appearance density of the keywords included in the pairs of keywords inside the check target text is higher than a reference value. When it is determined that the appearance density of the keywords included in the pairs of keywords inside the check target text is higher than the reference value, the similar part specifying unit 365 specifies a part that has a high appearance density by the determination as a similar part similar to the confidential document inside the check target text.

According to this configuration, because a similar part similar to the confidential document inside the check target text is specified in accordance with the appearance density of the keywords included in the pairs of keywords common with the confidential document, the document checking apparatus 2 can further determine similarity between the two documents with high accuracy. Particularly, when a partial block inside the confidential document is copied to the check target text, the pairs of keywords included in the copied block are common with the confidential document. Therefore, because the appearance density of the keywords common with the confidential document becomes high in the copied block, the document checking apparatus 2 can surely specify the copied block inside the check target text as a similar part similar to the confidential document.

Moreover, according to the second embodiment, the similar part determining unit 364 in the document checking apparatus 2 treats the predetermined number of consecutive keywords included in the check target text as a determination part and determines whether the number of keywords included in the pairs of keywords in the determination part is not less than a reference value. Then, when it is determined that the number of keywords included in the pairs of keywords is not less than the reference value, the similar part specifying unit 365 specifies the determination part as a similar part similar to the confidential document inside the check target text. According to this configuration, the document checking apparatus 2 treats a part, in which the number of keywords included in the pairs of keywords common with the confidential document in the predetermined number of consecutive keywords included in the check target text is not less than the reference value, as a similar part. As a result, the document checking apparatus 2 can easily specify similar parts between the check target text and the confidential document.

Moreover, according to the second embodiment, the similar part determining unit 364 in the document checking apparatus 2 treats the predetermined number of keywords up to a keyword that is located backward by one as the next determination part when the similar part with the confidential document is not specified. On the other hand, when the similar part with the confidential document is specified, the similar part determining unit 364 searches a keyword that is located more backward than the final keyword of the specified similar part and that is an initial keyword included in the pairs of keywords. The similar part determining unit 364 then treats the predetermined number of consecutive keywords up to the searched keyword as the next determination part. Furthermore, the similar part determining unit 364 determines whether the number of keywords included in the pairs of keywords in the determination part is not less than the reference value. According to this configuration, because the next determination part moves up to the initial keyword included in the rear pair of keywords of the similar part when the similar part is specified, the document checking apparatus 2 can perform the similar part specifying process on the check target text at high speed compared with the case where the determination part moves backward one by one.

Moreover, according to the second embodiment, the similarity alarming unit 366 in the document checking apparatus 2 outputs the specified similar part to, for example, a monitor when the similar part similar to the confidential document is specified. According to this configuration, the document checking apparatus 2 can definitely represent the similar part to a client who is going to transmit a mail document if the check target text is the mail document. Therefore, the client can easily recognize that the check target text is similar to the confidential document. As a result, the document checking apparatus 2 can easily press the client for the check before transmission. Similarly, the document checking apparatus 2 can alert the malicious client before the transmission.

Moreover, according to the second embodiment, the hash value computing unit 322 in the document checking apparatus 2 multiplies the character code of the first character of a keyword by the character code of the last character among the character codes of all characters constituting the keyword. Then, the hash value computing unit 322 adds the character codes of the remaining characters except for the first and last characters to the multiplication value and divides the added value by the maximum number of the hash values. The hash value computing unit 322 then treats a value obtained by adding one to the residual value of the division result as a hash value. According to this configuration, even if the sequence of middle characters excepting the first and last characters of the keyword is replaced with malicious intent or by typing errors, the document checking apparatus 2 can prevent the change of the hash value caused by a different character string. For example, when the regular character string of the keyword is "order", it is assumed that the sequence of middle characters is replaced like "oedrr" or "oderr". Because the hash value of the replaced character string is equivalent to the hash value of the regular character string, the document checking apparatus 2 can prevent the change of the hash value due to a character string.

[c] Third Embodiment

The document checking apparatus 1 according to the first embodiment determines whether the number of pairs of hash values common to the check target text of the mail document and the confidential document is not less than a predetermined value to determine similarity between both the documents (similarity check 1). Then, when it is determined that there is the possibility of similarity by using "similarity check 1", the document checking apparatus 1 determines whether the number of three continuous hash values is not less than a predetermined value to determine similarity between both the documents (similarity check 2). Moreover, when it is determined that there is the possibility of similarity by using "similarity check 1", the document checking apparatus 2 according to the second embodiment specifies a similar part similar to the confidential document inside the check target text. However, the document checking apparatus 2 is not limited to the mail document process. Therefore, the document checking apparatus 2 may specify a similar part similar to the confidential document inside the check target text, which is obtained by performing optical character recognition (OCR) on document images.

Configuration of Document Checking Apparatus According to Third Embodiment

Figure 25:
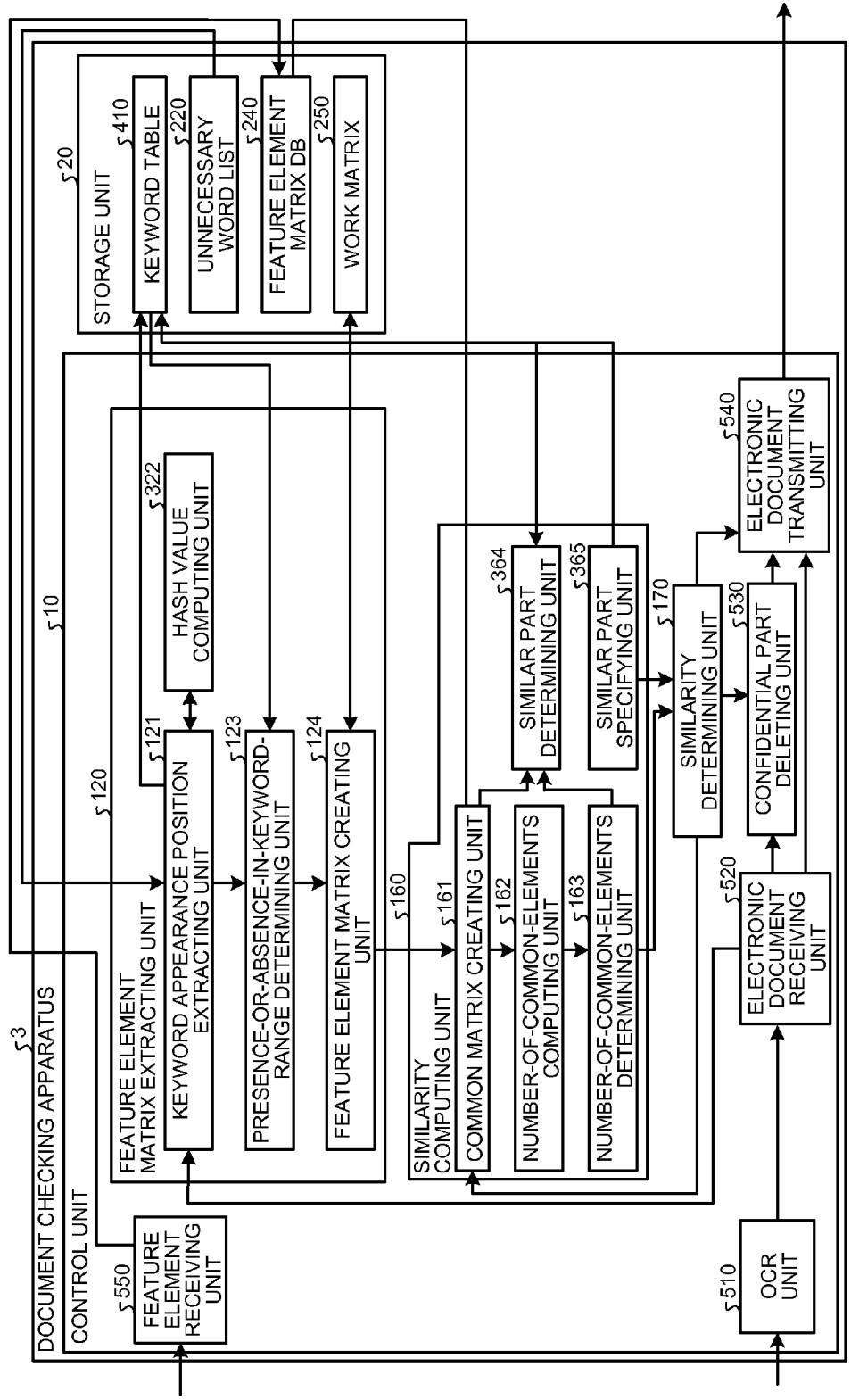
FIG. 25 is a functional block diagram illustrating the configuration of a document checking apparatus according to a third embodiment.

In the third embodiment, it will be now explained about a document checking apparatus that specifies a similar part similar to a confidential document inside a check target text that is obtained performing optical character recognition on a document image. FIG. 25 is a functional block diagram illustrating the configuration of a document checking apparatus 3 according to the third embodiment. The same components as those of the document checking apparatus 2 illustrated in FIG. 17 have the same reference numbers and thus the explanations of the overlapping configuration and operation are omitted. A difference between the second embodiment and the third embodiment is that an OCR unit 510 and a feature element receiving unit 550 are added. A further difference between the second embodiment and the third embodiment is that the in-company domain determining unit 130, the feature element matrix adding unit 140, the serializing unit 150, the in-company domain definition 230, and the similarity alarming unit 366 are deleted. Furthermore, the mail receiving unit 110, the mail transmission rejecting unit 180, and the mail transmitting unit 190 are respectively changed into an electronic document receiving unit 520, a confidential part deleting unit 530, and an electronic document transmitting unit 540.

The OCR unit 510 optically performs character recognition on a document image, extracts the recognized characters, and transmits the extracted characters to the electronic document receiving unit 520 as a check target text. For example, the OCR unit 510 receives a character image and optically performs character recognition on the received character image when copying a document image, reading a document image with a scanner, or transmitting a document image with a facsimile machine. Furthermore, the OCR unit 510 extracts the recognized characters and treats the extracted characters as a check target text. Then, the OCR unit 510 transmits the check target text to the electronic document receiving unit 520.

When receiving the check target text through the OCR unit 510, the electronic document receiving unit 520 informs the keyword appearance position extracting unit 121 of the check target text. Moreover, the electronic document receiving unit 520 informs the confidential part deleting unit 530 and the electronic document transmitting unit 540 of the received check target text.

When acquiring various types of notifications from the number-of-common-elements determining unit 163 or the similar part specifying unit 365, the similarity determining unit 170 sequentially determines whether the check target text and the confidential document are similar to each other for each confidential document in accordance with the acquired notifications. Specifically, when acquiring a document dissimilarity message, the similarity determining unit 170 informs the common matrix creating unit 161 of the effect that the next confidential document is selected when there is a confidential document for which similarity determination is not performed.

Moreover, when acquiring the document dissimilarity message, the similarity determining unit 170 informs the electronic document transmitting unit 540 of the transmission request of the check target text when there is not a confidential document for which similarity determination with the check target text is not performed. On the other hand, when acquiring a document similarity message from the similar part specifying unit 365, the similarity determining unit 170 informs the confidential part deleting unit 530 of the deletion request of a similar part.

The confidential part deleting unit 530 deletes the similar part of the check target text that is similar to the confidential document. Specifically, when acquiring the deletion request of the similar part from the similarity determining unit 170, the confidential part deleting unit 530 deletes the similar part including the range of the appearance position 410c of the keyword of which the similarity degree 410e is "1" in the keyword table 410 from the check target text. Then, the confidential part deleting unit 530 transmits the check target text from which the similar part is deleted to the electronic document transmitting unit 540.

When acquiring the check target text from the confidential part deleting unit 530, the electronic document transmitting unit 540 transmits the acquired check target text to a transmission destination. Moreover, when acquiring the transmission request of the check target text from the feature element matrix adding unit 140 or the similarity determining unit 170, the electronic document transmitting unit 540 transmits the check target text acquired from the electronic document receiving unit 520 to the transmission destination.

The feature element receiving unit 550 receives the feature elements (signatures) of the confidential documents from an electronic computer that manages confidential documents and stores the feature elements for the received confidential documents in the feature element matrix DB 240. For example, the feature element receiving unit 550 receives a result obtained by serializing the feature element matrix for each confidential document and stores the received serialization result for each confidential document in the feature element matrix DB 240.

Because the processing procedures of a similar part specifying process according to the third embodiment are similar to those of the second embodiment (FIGS. 23 and 24), the explanations are omitted.

Application of Document Checking Apparatus According to Third Embodiment

Now, it will be explained about an example of the application of the document checking apparatus 3 according to the third embodiment with reference to FIG. 26. FIG. 26 is a diagram explaining an example of the application of the document checking apparatus according to the third embodiment. As illustrated in FIG. 26, the document checking apparatus 3 is used in a complex printer apparatus 4 of a copying machine and a printing machine along with a confidential document managing server 9.

The confidential document managing server 9 is a server that manages confidential documents, and includes a confidential document file 9a, a feature element generating device 9b, a feature element delivering device 9c, and a feature element matrix DB 9d. The confidential document file 9a stores a confidential document T6 acquired from an administrator or a network. The feature element generating device 9b takes out each confidential document from the confidential document file 9a, generates feature elements (signatures) for each confidential document, and holds the generated feature elements. In this case, the feature element generating device 9b generates a feature element matrix for each confidential document and stores a result obtained by serializing the generated feature element matrix in the feature element matrix DB 9d. The feature element delivering device 9c delivers the difference between feature elements of the confidential document to the document checking apparatus 3 at a predetermined timing. A predetermined timing may be a timing at which a confidential document is newly acquired or a timing at which a confidential document is deleted. In other words, it is sufficient that a predetermined timing is previously decided.

The printer apparatus 4 includes the document checking apparatus 3, a paper scanning device 4a, and a printing device 4b. The paper scanning device 4a scans a document image from a paper medium on which a document image T4 is drawn by copying or FAX and computerizes the document image. The document checking apparatus 3 receives a computerized document image T5 from the paper scanning device 4a or a client PCc, optically performs character recognition on the received document image, and converts the recognized document image into a check target text.

The document checking apparatus 3 specifies a similar part similar to a confidential document inside a check target text by using the similar part specifying method. In other words, the document checking apparatus 3 creates a common matrix from the feature element matrix of the check target text and the feature element matrix of the confidential document and determines whether there is a similar part similar to the confidential document inside the check target text by using the created common matrix. Then, when it is determined that there is a similar part similar to the confidential document inside the check target text, the document checking apparatus 3 specifies the similar part. Then, the document checking apparatus 3 deletes the specified similar part from the check target text and transmits the check target text from which the characters of the similar part are deleted to the printing device 4b.

When receiving the check target text from the document checking apparatus 3, the printing device 4b prints the received check target text and outputs a printed document T7. In other words, when there is a similar part similar to the confidential document inside the check target text, the printing device 4b prints the check target text from which the characters of the similar part are deleted and outputs the text as the printed document T7.

For example, it will be explained about a printed document printed by the printer apparatus 4 according to the third embodiment with reference to FIG. 27. FIG. 27 is a diagram explaining an example of a print result using the printer apparatus according to the third embodiment. As illustrated in FIG. 27, the paper scanning device 4a scans a document image S1 formed on a paper medium. Then, the document checking apparatus 3 converts the scanned document image S1 into a check target text S2 by using the OCR unit 510. In this case, the document checking apparatus 3 may fail in the character recognition performed by the OCR unit 510 in some cases. In the example of FIG. 27, black circles inside the check target text S2 are parts on which the character recognition is not performed by the OCR unit 510.

The document checking apparatus 3 determines whether there is a similar part similar to a confidential document S3 inside the check target text S2. In the example of FIG. 27, the document checking apparatus 3 determines that a dashed part indicated by the reference number S2a inside the check target text S2 is similar to the confidential document S3 and thus there is a similar part. Then, the document checking apparatus 3 specifies the dashed part indicated by the reference number S2a as a similar part. Furthermore, the printing device 4b paints with white the similar part S2a that is specified by the document checking apparatus 3 from the check target text S2 and prints a printed document S4.

Effect of Third Embodiment

As described above, according to the third embodiment, the OCR unit 510 in the document checking apparatus 3 optically performs character recognition on a document image, extracts the recognized characters, and treats the extracted characters as a check target text. According to this configuration, because a similar part can be specified from characters on which character recognition is accurately performed even if character recognition cannot be optically and accurately performed on a document image, the document checking apparatus 3 can easily find a document image having high confidentiality that is created from a confidential document.

Modifications

In the second embodiment and the third embodiment, the hash value computing unit 322 multiplies the character code of the first character by the character code of the last character that constitute a keyword, divides a value, which is obtained by adding the character codes of the other characters to the multiplied value, by the maximum number of hash values, and adds 1 to the residual value. However, the hash value computing unit 322, for example, may divide a value, which is obtained by adding all character codes of characters constituting a keyword as explained in the first embodiment, by the maximum number of hash values and add 1 to the residual value.

Moreover, in the second embodiment and the third embodiment, the number-of-common-elements determining unit 163 firstly determines whether the number of pairs of hash values common to a check target text and a confidential document is not less than a predetermined value to determine similarity between both the documents (similarity check 1). Secondly, when it is determined that there is the possibility of similarity by using "similarity check 1", the similar part determining unit 364 determines whether the appearance density of keywords included in the pairs of keywords inside the check target text is higher than a reference value. Then, when it is determined that the appearance density is high, the similar part specifying unit 365 specifies a part that has a high appearance density by determination as a similar part. However, the present invention is not limited to this. When it is determined that there is the possibility of similarity by using "similarity check 1", "similarity check 1" may be used together with "similarity check 2" explained in the first embodiment.

Moreover, the document checking apparatuses 1 to 3 can be realized by mounting the functions of the control unit 10 and the storage unit 20 on an information processing apparatus such as a personal computer or a workstation that is well known.

Each component of each apparatus illustrated in the drawings is a functional concept. Therefore, these components are not necessarily constituted physically as illustrated in the drawings. In other words, the specific configuration of dispersion/integration of each apparatus is not limited to the illustrated configuration. Therefore, all or a part of each apparatus can dispersed or integrated functionally or physically in an optional unit in accordance with various types of loads or operating conditions. For example, the feature element matrix adding unit 140 and the serializing unit 150 may be integrated as one unit. On the other hand, the similar part determining unit 364 may be dispersed into a determining unit that determines whether it is a similar part and a determination part searching unit that searches a determination part. Moreover, each of different apparatuses may have the storage unit 20 or the feature element matrix extracting unit 120 to realize the functions of the document checking apparatuses 1 to 3 by using network connection and cooperation. Moreover, the OCR unit 510 or the confidential part deleting unit 530 may be provided as the external device of the document checking apparatus 3 to be embedded in the printer apparatus 4 or to be connected via a network.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. Moreover, the present invention is not limited to the effects described in the present embodiments.

Moreover, each component of the document checking apparatuses 1 to 3 illustrated in the drawings is a functional concept. Therefore, these components are not necessarily constituted physically as illustrated in the drawings. It goes without saying that the specific configurations of the document checking apparatuses 1 to 3 are not limited to the drawings.

All or a part of the process functions performed by the document checking apparatuses 1 to 3 may be realized by a CPU (Central Processing Unit) (or microcomputer such as MPU (Micro Processing Unit) or MCU (Micro Controller Unit)) and a program that is analyzed and executed by the CPU (or microcomputer such as MPU or MCU), or may be realized by a hardware by wired logic.

As described above, according to an aspect of the present invention, the document checking apparatus, the computer-readable recording medium, and the document checking method can determine a similarity between a transmission document and a confidential document with high accuracy even if the transmission document among determination target documents is a document obtained by revising the structure of sentences inside a specific document, for example, the confidential document or the document obtained by modifying particles inside the confidential document.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A document checking apparatus comprising:
   a memory; and
   a processor coupled to the memory, wherein the processor executes a process comprising:
   extracting character strings each of which includes a predetermined word or a predetermined phrase from a target document and a confidential document that becomes a comparison target when determining similarity between documents;
   first determining, based on appearance positions of the character strings extracted at the extracting, whether another character string is extracted within a predetermined range extending from a target character string toward either front or rear of the documents at the extracting;
   generating, when it is determined at the first determining that the another character string is extracted within the predetermined range, a feature element matrix having a specific value in a matrix element at a row and a column corresponding to a pair of hash values of the target character string and the another character string within the predetermined range;
   comparing the feature element matrix of the target document and the feature element matrix of the confidential document generated at the generating; and
   second determining whether a number of common elements having the specific value commonly among the feature element matrices of the target document and the confidential document is not less than a first similarity determination number to determine similarity between the target document and the confidential document on the basis of the determination result.

2. The document checking apparatus according to claim 1, wherein the second determining includes determining, when it is determined that the number of the common elements is not less than the first similarity determination number, whether a number of a group of at least three or more character strings that appears within the same predetermined range is not less than a second similarity determination number.

3. The document checking apparatus according to claim 2, wherein the process further comprises rejecting, when it is determined that the number of the group of at least three or more character strings that appears within the same predetermined range is not less than the second similarity determination number, transmission to another transmission partner other than a transmission permit partner of the target document.

4. The document checking apparatus according to claim 1, wherein the memory stores the feature element matrix of the target document generated at the generating as the feature element matrix of the confidential document when the target document is transmitted to a transmission permit partner.

5. The document checking apparatus according to claim 1, wherein
   the second determining includes:
   determining, when it is determined that the number of the common elements is not less than the first similarity determination number, whether an appearance density of the pair of the target character string and the another character string inside the target document is higher than a reference value; and
   specifying, when it is determined that the appearance density of the pair of the target character string and the another character string inside the target document is higher than the reference value, a part that has a high appearance density by the determination as a similar part similar to the confidential document inside the target document.

6. The document checking apparatus according to claim 5, wherein
   the second determining includes treating a predetermined number of consecutive character strings included in the target document as a determination part and determines whether a number of pairs of the target character string and the another character string inside the determination part is not less than the reference value, and
   the specifying includes specifying, when it is determined that the number of the pairs of the target character string and the another character string is not less than the reference value, the determination part as a similar part similar to the confidential document inside the target document.

7. The document checking apparatus according to claim 6, wherein the second determining includes
   treating, when the similar part is not specified, a predetermined number of consecutive character strings starting from a character string next to a forehand character string of the determination part as a next determination part,
   treating, when the similar part is specified, a predetermined number of consecutive character strings ending at a character string corresponding to the common elements and located more backward than the specified similar part as a next determination part, and determining whether the number of pairs of the target character string and the another character string inside the next determination part is not less than the reference value.

8. The document checking apparatus according to claim 5, further comprising an output unit that outputs the similar part specified by the processor.

9. The document checking apparatus according to claim 5, further comprising an optical character recognition unit that performs optical character recognition on a document image, extracts the recognized characters, and treats the extracted characters as the target document.

10. A non-transitory computer readable storage medium having stored therein a document checking program, the document checking program causing a computer to execute a process comprising:

extracting character strings each of which includes a predetermined word or a predetermined phrase from a target document and a confidential document that becomes a comparison target when determining similarity between documents;

first determining, based on appearance positions of the character strings extracted, whether another character string is extracted within a predetermined range extending from a target character string toward either front or rear of the documents at the extracting;

generating, when it is determined that the another character string is extracted within the predetermined range, a feature element matrix having a specific value in a matrix element at a row and a column corresponding to a pair of hash values of the target character string and the another character string within the predetermined range;

comparing the feature element matrix of the target document and the feature element matrix of the confidential document; and second determining whether a number of common elements having the specific value commonly among the feature element matrices of the target document and the confidential document is not less than a first similarity determination number to determine similarity between the target document and the confidential document on the basis of the determination result.

11. The non-transitory computer readable storage medium according to claim 10, wherein the second determining includes determining, when it is determined that the number of the common elements is not less than the first similarity determination number, whether a number of a group of at least three or more character strings that appears within the same predetermined range is not less than a second similarity determination number.

12. The non-transitory computer readable storage medium according to claim 10, wherein the second determining includes determining, when it is determined that the number of the common elements is not less than the first similarity determination number, whether an appearance density of the pair of the target character string and the another character string inside the target document is higher than a reference value, and specifying, when it is determined that the appearance density of the pair of the target character string and the another character string inside the target document is higher than the reference value, a part that has a high appearance density by the determination as a similar part similar to the confidential document inside the target document.

13. A document checking method, comprising:

extracting character strings each of which includes a predetermined word or a predetermined phrase from a target document and a confidential document that becomes a comparison target when determining similarity between documents;

first determining, based on appearance positions of the character strings extracted, whether another character string is extracted within a predetermined range extending from a target character string toward either front or rear of the documents at the extracting, by a processor;

generating, when it is determined that the another character string is extracted within the predetermined range, a feature element matrix having a specific value in a matrix element at a row and a column corresponding to a pair of hash values of the target character string and the another character string within the predetermined range, by the processor;

comparing the feature element matrix of the target document and the feature element matrix of the confidential document, by the processor; and second determining whether a number of common elements having the specific value commonly among the feature element matrices of the target document and the confidential document is not less than a first similarity determination number to determine similarity between the target document and the confidential document on the basis of the determination result, by the processor.

14. The document checking method according to claim 13, wherein the second determining includes determining, when it is determined that the number of the common elements is not less than the first similarity determination number, whether an appearance density of the pair of the target character string and the another character string inside the target document is higher than a reference value, and specifying, when it is determined that the appearance density of the pair of the target character string and the another character string inside the target document is higher than the reference value, a part that has a high appearance density by the determination as a similar part similar to the confidential document inside the target document.

\* \* \* \* \*